(12) United States Patent
Muqattash et al.

(10) Patent No.: US 8,320,244 B2
(45) Date of Patent: Nov. 27, 2012

(54) RESERVATION BASED MAC PROTOCOL

(75) Inventors: Alaa Muqattash, San Diego, CA (US); Arjunan Rajeswaran, San Francisco, CA (US); Dinesh Dharmaraju, San Diego, CA (US); Saishankar Nandagopalan, San Diego, CA (US); Ranganathan Krishnan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1439 days.

(21) Appl. No.: 11/685,687

(22) Filed: Mar. 13, 2007

(65) Prior Publication Data
US 2009/0052319 A1   Feb. 26, 2009

(51) Int. Cl.
*H04J 1/16* (2006.01)
(52) U.S. Cl. ........................................ 370/230; 370/235
(58) Field of Classification Search .................. 370/230, 370/235, 310, 310.2, 329, 328, 341, 348, 370/338, 443, 335, 342, 351; 455/450, 509
See application file for complete search history.

(56) References Cited

U.S. PATENT DOCUMENTS

| | | | |
|---|---|---|---|
| 6,782,271 B2 | 8/2004 | Huh et al. | |
| 6,975,604 B1 | 12/2005 | Ishida et al. | |
| 6,975,609 B1 | 12/2005 | Khaleghi et al. | |
| 6,990,080 B2 | 1/2006 | Bahl et al. | |
| 7,031,741 B2 | 4/2006 | Lee et al. | |
| 7,050,405 B2 | 5/2006 | Attar et al. | |
| 7,116,982 B2 | 10/2006 | Balachandran et al. | |
| 7,269,423 B2 | 9/2007 | Lee et al. | |
| 7,272,310 B2 | 9/2007 | Maciocco et al. | |
| 7,499,486 B2 | 3/2009 | Boer et al. | |
| 7,613,138 B2 * | 11/2009 | Bahl et al. | 370/310.2 |
| 7,623,897 B1 * | 11/2009 | Elliott | 455/574 |
| 7,693,122 B2 * | 4/2010 | Carlson et al. | 370/341 |
| 8,031,603 B1 * | 10/2011 | Polk et al. | 370/235 |
| 2003/0009582 A1 | 1/2003 | Qiao et al. | |
| 2003/0078050 A1 | 4/2003 | Carlborg et al. | |
| 2003/0128687 A1 * | 7/2003 | Worfolk et al. | 370/351 |
| 2004/0083287 A1 | 4/2004 | Gao et al. | |
| 2004/0209579 A1 | 10/2004 | Vaidyanathan | |
| 2004/0264960 A1 | 12/2004 | Maciocco et al. | |
| 2005/0058104 A1 * | 3/2005 | Yomo et al. | 370/335 |

(Continued)

FOREIGN PATENT DOCUMENTS

CN            1386338 A         12/2002

(Continued)

OTHER PUBLICATIONS

Carlson, et al.,"Distributed Maintenance of Resource Reservation Paths in Multihop 802.11 Networks",Vehicular technology conference, 2004, VTC2004-Fall, 2004 IEEE 60th, pp. 2994-2998, Sep. 26-29, 2004.

(Continued)

*Primary Examiner* — Michael Thier
*Assistant Examiner* — Abdullah Riyami
(74) *Attorney, Agent, or Firm* — Qualcomm Patent Group; James H. Yancey, Jr.

(57) ABSTRACT

Embodiments describe scheduling communication in an ad hoc multihop network. Included is a reservation based Medium Access Control (MAC) protocol that has resources scheduled along the path from source to destination. Admission control is performed on a per-hop basis and a decision is made, in a distributed manner, if enough resources exist along the multihop path to admit a new communication.

22 Claims, 14 Drawing Sheets

U.S. PATENT DOCUMENTS

| | | | |
|---|---|---|---|
| 2005/0117541 A1* | 6/2005 | Negus .......................... | 370/329 |
| 2005/0169232 A1 | 8/2005 | Sakoda et al. | |
| 2006/0215611 A1 | 9/2006 | Nakagawa et al. | |
| 2007/0041322 A1 | 2/2007 | Choi et al. | |
| 2007/0093209 A1 | 4/2007 | Agrawal et al. | |
| 2007/0253368 A1 | 11/2007 | Zhang et al. | |
| 2008/0144493 A1* | 6/2008 | Yeh .............................. | 370/230 |
| 2008/0160921 A1 | 7/2008 | Li et al. | |
| 2008/0167063 A1 | 7/2008 | Nandagopalan et al. | |
| 2008/0175149 A1* | 7/2008 | Andrews et al. ............... | 370/235 |
| 2008/0285480 A1* | 11/2008 | Panwar et al. ................. | 370/253 |
| 2009/0011711 A1 | 1/2009 | Kawasaki et al. | |
| 2010/0265891 A1* | 10/2010 | Belcea .......................... | 370/328 |

FOREIGN PATENT DOCUMENTS

| | | | |
|---|---|---|---|
| CN | 1650283 A | | 8/2005 |
| EP | 0749261 A2 | | 12/1996 |
| EP | 1059773 A2 | | 12/2000 |
| JP | 2003259442 A | | 9/2003 |
| JP | 2006050519 A | | 2/2006 |
| JP | 2006270150 A | | 10/2006 |
| JP | 2006304355 A | | 11/2006 |
| JP | 2007515819 T | | 6/2007 |
| JP | 2008500753 T | | 1/2008 |
| TW | I242955 | | 11/2005 |
| TW | I248735 | | 2/2006 |
| WO | WO9604718 A1 | | 2/1996 |
| WO | 0039967 | | 7/2000 |
| WO | 2005020517 | | 3/2005 |
| WO | 2005076544 | | 8/2005 |
| WO | WO2005125252 A1 | | 12/2005 |
| WO | WO2006089568 A1 | | 8/2006 |

OTHER PUBLICATIONS

Chi-Hsiang Yeh et al; "Signaling and QoS guarantees in mobile ad hoc networks," ICC 2002. 2002 IEEE International Conference on Communications. Conference Proceedings, New York, Apr. 28-May 2, 2002, IEEE International Conference on Communications, New York, NY : IEEE, US, vol. 1 of 5, pp. 3284-3290, XP010590078.

International Search Report—PCT/US2007/072672, International Search Authority—European Patent Office—Feb. 4, 2008.

Written Opinion—PCT/US2007/072672, International Search Authority—European Patent Office—Feb. 4, 2008.

European Search Report—EP09159687—Search Authority—The Hague—Mar. 21, 2012.

Sampath A., et al., "Power control and resource management for a multimedia CDMA wireless system, XP010150786," Personal Indoor and Mobile Radio Communications. PIMRC '95. Wireless: Merging Onto the Information Superhighway., Sixth IEEE International Symposium on Toronto.

Final Office Action, dated Jul. 3, 2012, JPO Patent Application No. 2009-544904, with Translation, pp. 1-3, English translation provided by JP Counsel.

* cited by examiner

RESERVATION BASED MAC PROTOCOL

BACKGROUND

I. Field

The following description relates generally to wireless communications and more particularly to Ultra Wideband ad hoc wireless communications networks.

II. Background

Wireless networking systems have become a prevalent means by which a large number of people worldwide communicate. Wireless communication devices have become smaller and more powerful to meet consumer needs, which include improved portability and convenience. Users have found many uses for wireless communication devices, such as cellular telephones, personal digital assistants (PDAs), and the like, and such users demand reliable service and expanded coverage areas.

Wireless communications networks are commonly utilized to communicate information regardless of where a user is located (inside or outside a structure) and whether a user is stationary or moving (e.g., in a vehicle, walking). Generally, wireless communications networks are established through a mobile device communicating with a base station or access point. The access point covers a geographic region or cell and, as the mobile device is operated, it may move in and out of these geographic cells. To achieve uninterrupted communication the mobile device is assigned resources of a cell it has entered and de-assigned resources of a cell it has exited.

A network can be constructed utilizing solely peer-to-peer communication without utilizing access points. In further embodiments, the network can include both access points (infrastructure mode) and peer-to-peer communication. These types of infrastructures are referred to as ad hoc networks or independent basic service sets (IBSS). Ad hoc networks can be self-configuring whereby when a mobile device (or access point) receives communication from another mobile device, the other mobile device is added to the network. As the mobile devices leave the area, they are dynamically removed from the network. Thus, the topography of the network can be constantly changing. In a multihop topology, a transmission is transferred though a number of hops or segments, rather than directly from a sender to a recipient.

Various factors can affect the efficiency and performance of wireless communication in networks, such as an Ultra Wideband (UWB) ad hoc network. For example, the amount of traffic or data communication occurring in a coverage area can reduce data transmission times and produce interference. Therefore, the quality of service (QoS) for communication can be affected by the other communications occurring in the network at substantially the same time, in exclusion-based schemes, such as Carrier Sense Multiple Access with Collision Avoidance (CSMA/CA) utilized in wireless LAN (IEEE 802.11), the number of simultaneous transmissions and the data throughput may be reduced if there is interference present in the network.

To overcome the aforementioned as well as other deficiencies, what is needed is a technique to establish QoS communication in an ad hoc network while mitigating interference caused by other communications within the network, which allows for the scheduling of a larger number of simultaneous data transfers, thus increasing the data throughput of the network.

SUMMARY

The following presents a simplified summary in order to provide a basic understanding of some aspects of the disclosed embodiments. This summary is not an extensive overview and is intended to neither identify key or critical elements nor delineate the scope of such embodiments. Its sole purpose is to present some concepts of the described embodiments in a simplified form as a prelude to the more detailed description that is presented later.

In accordance with one or more embodiments and corresponding disclosure thereof, various aspects are described in connection with an UWB ad hoc network wherein a reservation based Medium Access Control (MAC) protocol has resources scheduled along the path from source to destination.

According to some embodiments is a method for establishing quality of service (QoS) communications in an ad hoc network. The method includes ascertaining a path to a destination device and sending a Request-to-Reserve (RTR) control packet to at least a first intermediate device identified along the path. A first Reservation Confirm (RC) packet is received from the at least a first intermediate device in response to the RTR packet. The first RC packet includes a schedule. A second RC packet is transmitted to the at least a first intermediate device in response to the first RC packet.

In accordance with some embodiments is apparatus that establishes QoS communications, in an ad hoc network. The apparatus includes a transmitter that sends an RTR control packet to a first device that is included in a path to a destination device. The apparatus also includes a receiver that receives a first RC packet in response to the RTR control packet. The transmitter sends a second RC packet to the first device in response to the first RC packet.

According to some embodiments is an apparatus that establishes QoS communications in an ad hoc network. The apparatus includes a means for determining a path to a destination device and a means for conveying an RTR packet that comprises a reservation table, to a first device. Also included in the apparatus are a means for receiving an RC packet that comprises a schedule in response to the conveyed RTR control packet and a means for sending a reply RC packet in response to the received RC packet. The reply RC packet confirms the schedule.

According to some embodiments is a computer-readable medium embodying a method for establishing QoS communications in an ad hoc network. The method includes determining a communication path between a source device and a destination device and transmitting an RTR packet to a first device located along the communication path. A first RC packet, is received from the first device in response to the transmitted RTR packet and a second RC packet is transmitted to the first device that confirms the information received in the first RC packet.

In accordance with some embodiments is a processor for establishing QoS communications in an ad hoc network. The processor is configured to determine a communication path between a source device and a destination device and convey an RTR packet to a first device located on the communication path. The RTR packet includes a reservation table of the source device. The processor is further configured to receive an RC packet in response to the RTR packet and send a response RC packet that confirms the schedule in the received RC packet. The RC packet includes a schedule for the source device.

In accordance with some embodiments is a method for scheduling communications in an ad hoc communications network. The method includes receiving an RTR control packet from at least a first wireless device and determining a schedule from the at least a first wireless device to a destination device. An earliest schedule for communication between the at least a first wireless device and the destination device is chosen based on an admission control policy and an RTR packet is sent to the destination device. An RC packet is received from the destination device in response to the RTR packet and the RC packet, is transmitted to the at least a first wireless device. The RC packet includes a communication schedule.

In accordance with some embodiments is an apparatus that schedules communications in ad hoc communications network. The apparatus includes a receiver the receives an RTR control packet from at least a first node and a scheduler that analyzes the available schedules and chooses an earliest schedule for communication between a source node and a destination node based on an admission control policy. Also included is a transmitter that transmits an RTR packet to the destination node. The RTR packet includes the earliest communication schedule.

In accordance with some embodiments is an apparatus that schedules communications in an ad hoc communications network. The apparatus includes a means for receiving an RTR control packet that includes a path from a source device to a destination device and a means for analyzing available schedules for the path. Also included in the apparatus are a means for choosing the earliest schedule and a means for conveying an RTR packet to the destination device. The RTR packet includes the earliest schedule.

According to some embodiments is a computer-readable medium embodying a method for scheduling communications in an ultra wideband ad hoc communications network. The method includes receiving an RTR control packet that includes a path from a source device to a destination device and analyzing available schedules for tire path. The earliest schedule is chosen and an RTR packet is conveyed to the destination device. The RTR packet includes the earliest schedule.

According to some embodiments is a processor for scheduling communications in an ad hoc communications network. The processor is configured to receive an RTR control packet from at least a first wireless device and determine a schedule from the at least a first wireless device, to a destination device based on an admission control policy. The processor is further configured to choose an earliest schedule for communication between the at least a first wireless device and the destination device. An RTR packet is sent to the destination device and an RC packet is received from the destination device in response to the RTR packet. The processor is further configured to transmit the RC packet to the at least a first wireless device. The RC packet includes a communication schedule.

In accordance with some embodiments is a method for scheduling ad hoc communications. The method includes receiving an RTR packet from at least a first device and determining a feasibility schedule based in part on the communication schedule utilizing an admission control policy. The RTR packet includes a communication schedule. An RC packet that includes the feasibility schedule is transmitted to the at least a first device.

In accordance with some embodiments is an apparatus that schedules ultra wideband ad hoc communications. The method includes a receiver that receives an RTR packet from at least a first device and a scheduler that determines a schedule based in part on information included in the RTR packet. Also included in the apparatus is a transmitter that transmits an RC packet in response to the received RTR packet. The RC packet includes one of the schedule or an infeasibility of the schedule.

According to some embodiments is an apparatus that schedules ultra wideband ad hoc communications. The apparatus includes a means for receiving an RTR packet and a means for determining a schedule that does not interfere with at least one communication that is scheduled. Also included is a means for sending an RC packet, that includes the schedule in response to the received RTR packet.

According to some embodiments is a computer-readable medium embodying a method for scheduling ad hoc communications. The method includes receiving an RTR packet from at least a first device and determining a schedule based in part on information included in the RTR packet. An RC packet that includes one of the schedule or an infeasibility of the schedule is transmitted in response to the received RTR packet.

In accordance with some embodiments is a processor for scheduling ad hoc communications. The processor is configured to receive an RTR packet and determine a schedule that does not interfere with at least one communication that is scheduled. The processor is further configured to send an RC packet that includes the schedule in response to the received RTR packet.

In accordance with some embodiments is a method for scheduling communications in a multihop ad hoc network. The method includes listening for RC packets communicated between neighboring devices and updating a reservation table of an intermediate device with information included in the RC packet. The method further includes receiving at a first intermediate device an RTR packet from a source device. The RTR packet contains a reservation table of the source device. The update reservation table and the source device reservation table are analyzed and a communication schedule between the source device and a destination device is determined based in part on the analyzed reservation tables.

In accordance with some embodiments is an apparatus that schedules communications in a multihop ad hoc network. The apparatus includes an observer that monitors communication occurring between active neighboring nodes and a configurer that updates a resource reservation table with information contained in the monitored communication. Also included in the apparatus is a receiver that accepts an RTR packet from a source device. The RTR packet includes a path between the source device and a destination device. A scheduler that schedules communication along the path from the source device to the destination device is also included.

According to some embodiments is an apparatus that schedules communications in a multihop ad hoc network. The apparatus includes a means for listening for RC packets communicated between neighboring devices and a means for updating a reservation table of an intermediate device with information included in the RC packet. Also included are a means for receiving at a first intermediate device an RTR packet from a source device and a means for analyzing the update reservation table and the source device reservation table. The RTR packet contains a reservation table of the source device. A means for determining a communication schedule between the source device and a destination device based in part on the analyzed reservation tables is also included in the apparatus.

In accordance with some embodiments is a computer-readable medium embodying a method for scheduling communications in a multihop ad hoc network. The method includes monitoring communication occurring between active neighboring nodes and updating a resource reservation table with information contained in the monitored communication. An RTR packet that includes a path between the source device and a destination device is accepted from a source device. A communication is scheduled along the path from, the source device to the destination device.

In accordance with some embodiments is a processor for scheduling communications in a multihop ad hoc network. The processor is configured to listen for RC packets communicated between neighboring devices and update a reservation table of an intermediate device with information included in the RC packet. The processor is further configured to receive at a first intermediate device an RTR packet from a source device, analyze the update reservation table and the source device reservation table and determine a communication schedule between the source device and a destination device based in part on the analyzed reservation tables. The RTR packet contains a reservation table of the source device To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
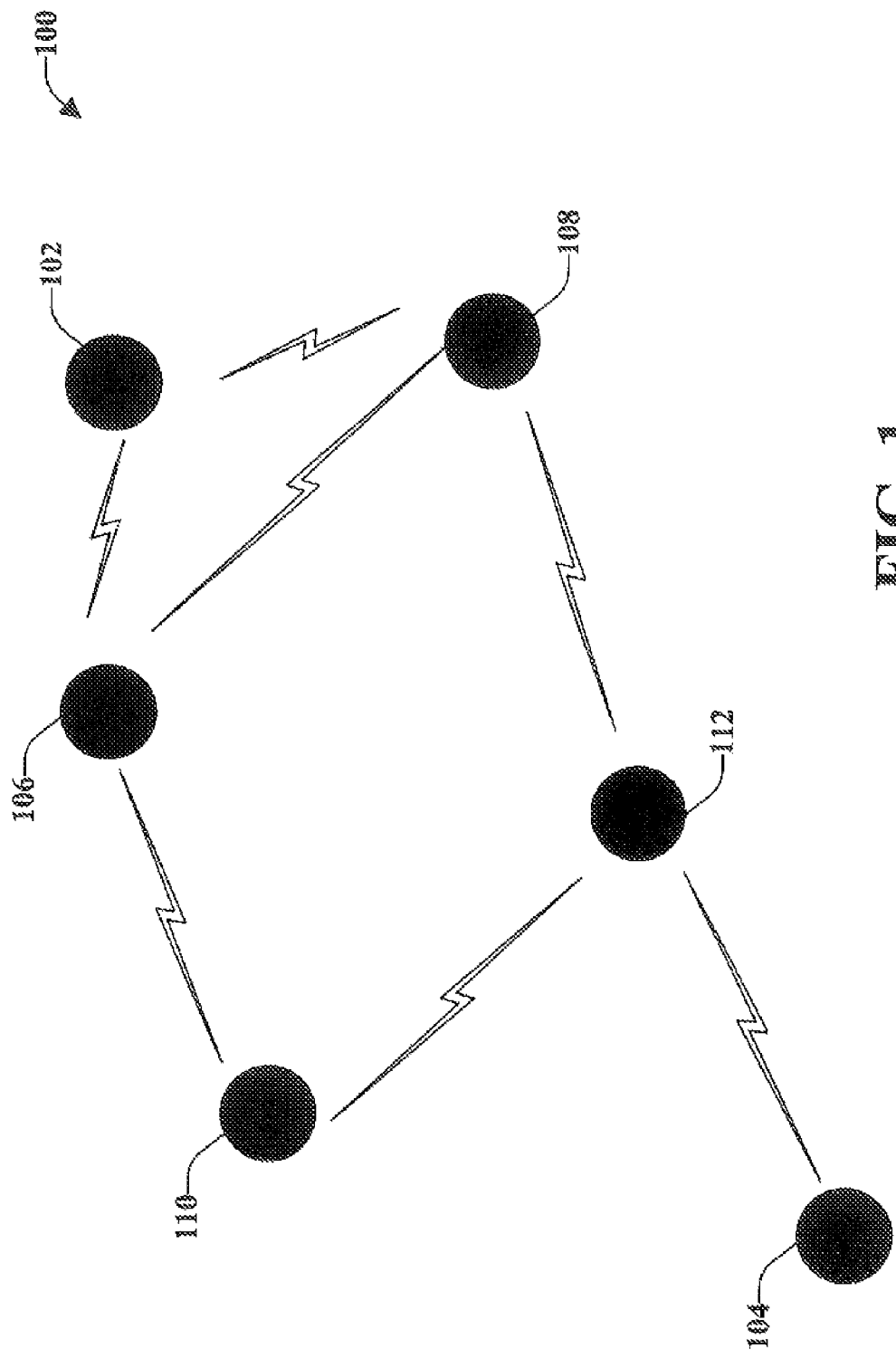
FIG. 1 illustrates routing communications in a multihop ad hoc wireless network.

Various embodiments are now described with reference to the drawings. In the following description, for purposes of explanation, numerous specific details are set forth in order to provide a thorough understanding of one or more aspects. It may be evident, however, that such embodiments) may be practiced without these specific details. In other instances, well-known structures and devices are shown in block diagram form in order to facilitate describing these embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system; and/or across a network such as the Internet with other systems by way of the signal).

Furthermore, various embodiments are described herein in connection with a user device. A user device can also be called a system, a subscriber unit, subscriber station, mobile station, mobile device, remote station, access point, base station, remote terminal, access terminal, handset, host, user terminal, terminal, user agent, wireless terminal, wireless device, or user equipment. A user device can be a cellular telephone, a cordless telephone, a Session Initiation Protocol (SIP) phone, a wireless local loop (WLL) station, a Personal Digital Assistant (PDA), a handheld device having wireless connection capability, or other processing device(s) connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various embodiments will be presented in terms of systems that may include a number of devices, components, modules, and the like. It is to be understood and appreciated that the various systems may include additional devices, components, modules, and the like, and/or may not include all of the devices, components, modules and so forth, discussed in connection with the figures. A combination of these approaches may also be used.

With reference now to the drawings, FIG. 1 illustrates routing communications in a multihop ad hoc wireless network 100. For example purposes and not limitation, the following will describe a communication routing in a wireless multihop ad hoc system. System 100 can include any number of mobile devices or nodes, of which six are illustrated, that are in wireless communication. Mobile devices can be, for example, cellular phones, smart phones, laptops, handheld communication devices, handheld computing devices, satellite radios, global positioning systems, Personal Digital Assistants (PDAs), and/or other suitable devices for communicating over wireless network 100. Wireless network 100 can also include one or more base stations or access points (not shown).

A sender or source node 102 may wish to communicate with receiver or destination node 104. To enable packet transfer between sender node 102 and receiver node 104, one or more intermediate nodes 106, 108, 110, and/or 112 can be utilized. It should be understood that any node 102-112 can be a sender node, a receiver node and/or an intermediary node.

Packet transfer between sender node 102 and receiver node 104 can take various paths. For example, packet can be transferred from sender node 102 to intermediate nodes 108 and 112 and ultimately arrive at its destination, receiver node 104. However, other routes are possible, such as from node 102 to node 106 to node 110 to node 112 and finally to node 104. It should be understood that packet can take a number of different routes or paths to reach its destination and, of course, it is not possible to explain all such routes.

Since nodes 102-112 can be mobile devices, they may move in and out of system 100. If a node is moved and can no longer communicate with the other nodes, a different path and communication schedule can be negotiated. Nodes may also move into system 100 and a path and a communication schedule can be created or negotiated that, includes the newly added node(s).

Thus, ad hoc networks are dynamic in nature and new links are being formed (due to new sessions) while other links may drop out of the network. This dynamic nature of links may also be caused by channel characteristics, such as fading or the reductions in signal intensity of one or all of the components of a signal. The dynamic nature can result in a choice for resource allocation. For example, in global resource allocation (GRA) schemes each time a new link is formed or terminated the resources of all (including outgoing) links are renegotiated. In incremental resource allocation (IRA) schemes, resources are allocated once at the start of a session. Thus, in IRA schemes the network allocates resources to new links while preserving the resources allocated to existing links.

System 100 can utilize a MAC protocol that can be configured to verify whether or not a communication meets a data rate and delay or Quality of Service (QoS) requirement. Based on the UWB physical layer, the MAC can be a CDMA based MAC, with limited exclusion. In addition, since system 100 has a dynamic ad hoc nature, an incremental and distributed scheme should be followed that allocate resources to new links while protecting existing links.

The various embodiments disclosed herein can relate to voice traffic having bidirectional links. Thus, the data to be scheduled can have a constant bit-rate. For example, each link could be transmitted at 9.6 Kbps ($R_{voice}$). The incurred delay from source to receiver (also known as mouth-ear delay) should be controlled. This delay can range from 150 ms to 200 ms for acceptable voice quality. A voice communication may incur a delay of transmission across a number of hops in addition to computational (e.g., coding, decoding) delays and buffering delays. Thus, the per-hop delay $T_{REP}$ should be limited to, for example, 20 ms, which is a convenient value. Also, resources should be scheduled from source to destination while maintaining the QoS parameters of data rate $R_{voice}$ and delay, which can be approximately 150 ms. It should be understood that while the various embodiments are described with reference to voice traffic, they can also apply to various other communications (e.g., data, video, music, and so on).

The MAC protocol utilized by system 100 is a Reservation Based MAC, with resources scheduled along the entire path from source to destination. That is to say, the reservation occurs along every link in the route before any of the links are permitted. This can result in the non-establishment of a voice call if its QoS is not guaranteed. The resource reserved is that of time slots (of varying sizes or lengths) with a repetition period of $T_{REP}$. This repetition period, combined with an admission control can help satisfy the QoS for the communication. System 100 can utilize CDMA and the concept of an interference margin (M) to leverage the spread spectrum nature of the UWB physical layer such as by allowing simultaneous transmission (e.g., scheduling rather than exclusion). A time-slot reclamation technique of Hybrid ARQ can also be utilized to improve resource utilization.

Each node maintains information about the nodes in its vicinity, such as in a resource reservation table (RT). Such a table can be an extension of a Network Allocation Vector (NAV) used in an IEEE 802.11 scheme. The resource reservation table can encode the subject node with knowledge about other active nodes (e.g., nodes that are receiving, transmitting, or scheduled to do either function) within the vicinity of subject node. For every active node in the vicinity, the resource reservation table can contain each active node's schedule (e.g., time slots of transmission), interference margin, power of transmission and path loss between nodes.

A resource reservation request (e.g., through a Request To Reserve (RTR) packet or a Reservation Confirm (RC) packet exchange) can occur utilizing an informed control mechanism, which can take multiple measures to mitigate inefficiencies that might occur ad hoc networks. Such measures can include listening to a common reservation channel (e.g., a common PN code utilized for reservation packets), which allows the node to obtain information about its vicinity. With the obtained knowledge about its vicinity, the node can transmit reservation packets in such a manner that the packets should not interfere with scheduled transmissions.

Another measure can include sending reservation packets (RTR/RC) at the rate $R_{RC}$ to obtain an appropriate range. This range can be considered an interference range (IR) or interference vicinity. Links within this range can be allotted separate resources if they interfere with other communications. Utilization of a different rate for the reservation channel can mitigate hidden terminal problems since the interference range is different from the transmission range. An admission control policy can then be utilized to determine the schedule. The determined schedule or infeasibility of the link can be conveyed to the transmitting node through an RC packet.

Transmission of RTR/RC packets at rate $R_{RC}$, which is a chosen range, can provide a large vicinity of each, node allowing each node to obtain information regarding potential interfering links (which should be scheduled). Thus, no hidden terminal or exposed node problem should exist.

In addition, since the range of the reservation packets are fixed, a shorter link should have a larger interference radius to the transmission radius ratio. Shorter links are generally stronger links and should be able to tolerate less interference. Thus, setting the range of RC/RTR packets to be the largest range possible can provide an adaptive nature to the network where stronger links have information about a larger surrounding area and thus, should be able to choose a better schedule with lower interference.

Figure 2:
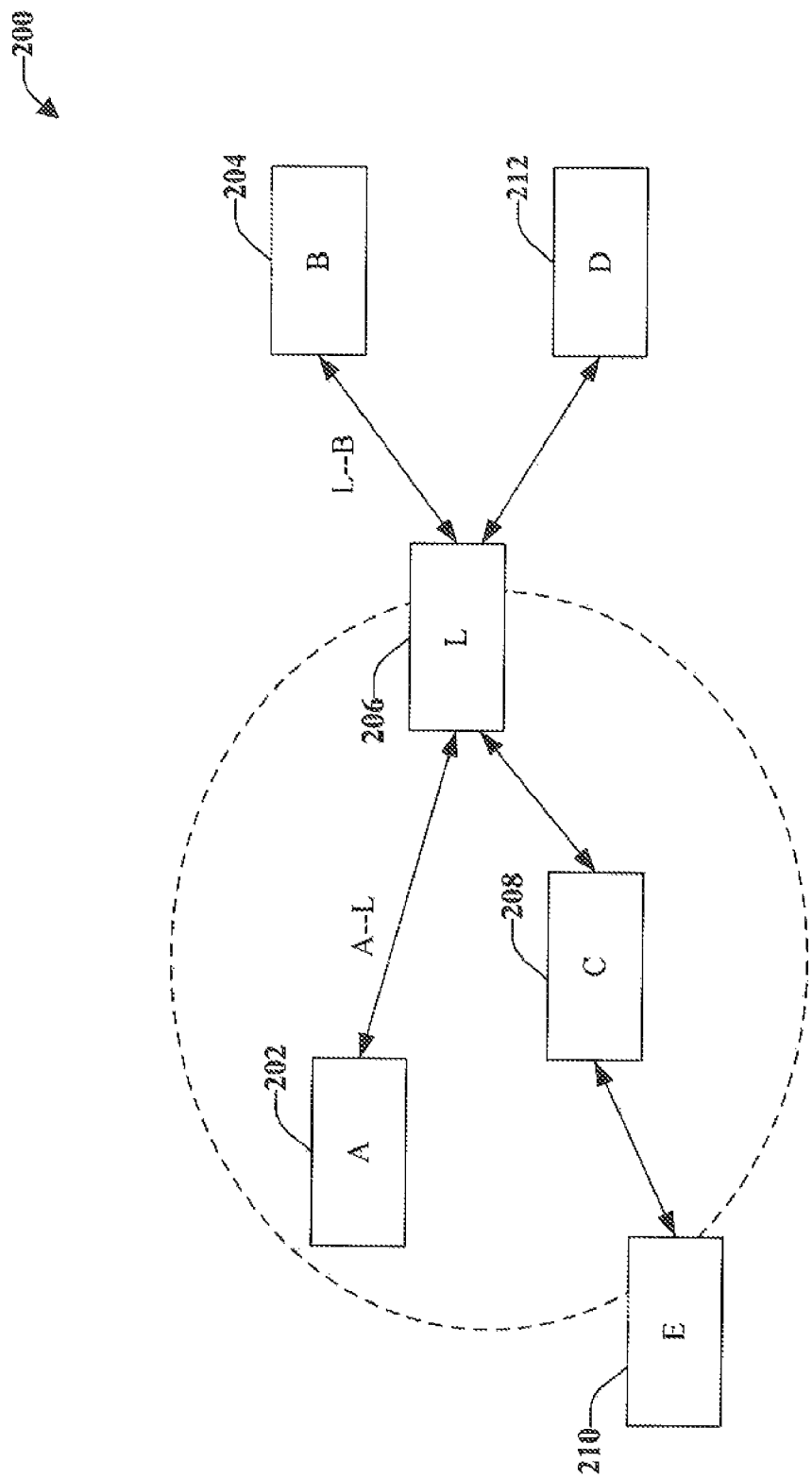
FIG. 2 illustrates scheduling within an UWB ad hoc wireless network.

FIG. 2 illustrates scheduling within an UWB ad hoc wireless network 200 in accordance with the various embodiments. Wireless network 200 includes a multitude of nodes, represented as Node A 202, Node B 204, Node L 206, Node C 208, Node E 210, and Node D 212. It should be understood that there could be more or fewer nodes, depending on the particular network.

Figure 3:
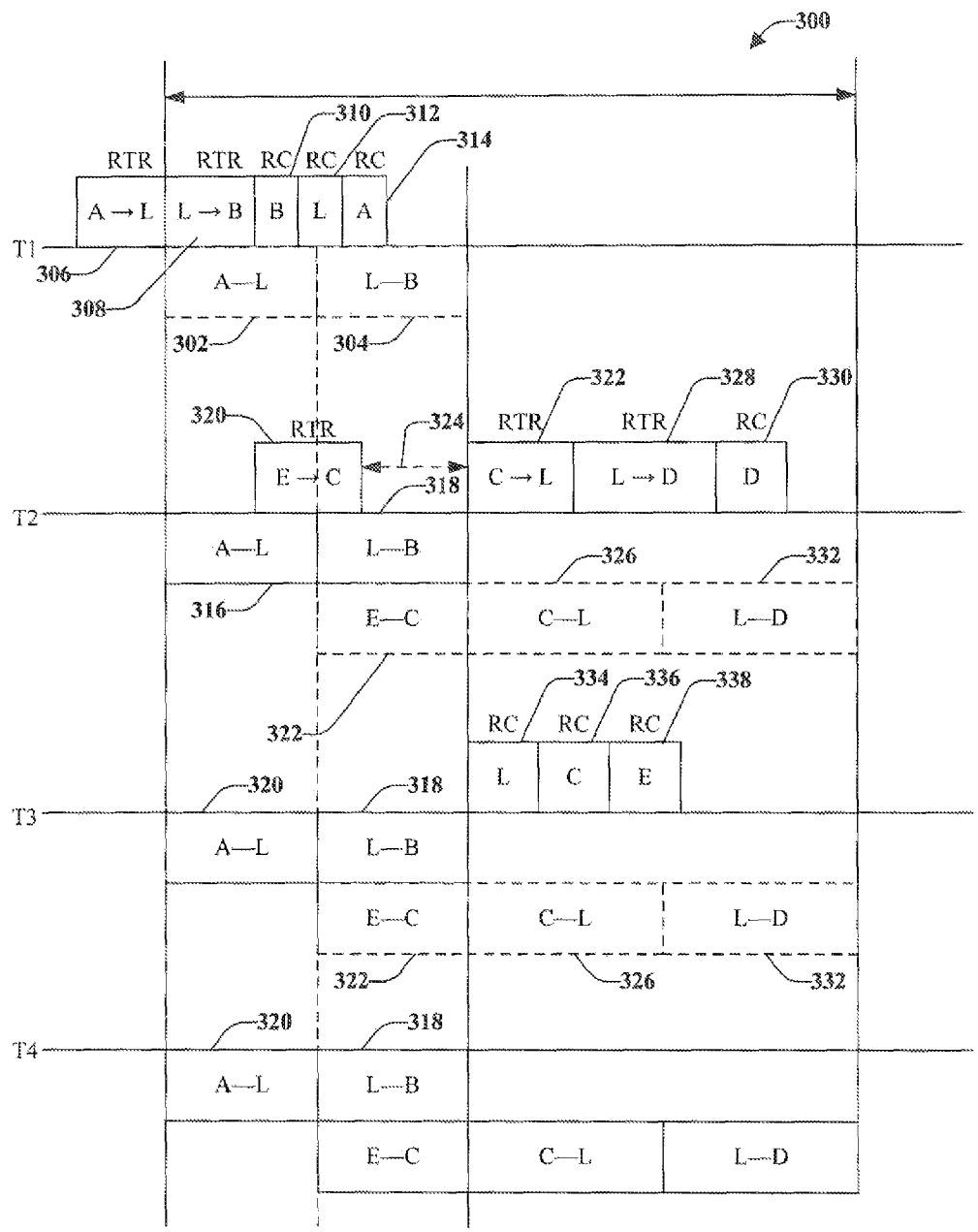
FIG. 3 illustrates an exemplary schedule for a reservation based MAC protocol in an UWB environment.

The following example is to illustrate an exemplary network utilizing the disclosed embodiments. Node A 202 desires to initiate a session with Node B 204. Node A 202 begins by searching or identifying a path between Node A 202 and Node B 204. This path should have enough resources (e.g., coarse estimate provided by an overlying QoS routing protocol) to establish the session between Node A 202 and Node B 204. This can be part of the quality-of-service (QoS) routing protocol running at a network layer of the protocol stack. For illustration purposes, it is assumed drat that at the MAC layer such a path has been found. The path can be named, for example, A-L-B. An exemplary schedule 300 for a reservation based MAC protocol in an UWB environment is illustrated in FIG. 3. This exemplary schedule 300 was constructed utilizing a voice packet having a length of 192 bits and sent at a rate of 153.6 Kbps (e.g., each set of two packets or bi-directional links takes 2.5 ms). However, it should be understood that other voice packet lengths and rates could be utilized with the disclosed embodiments.

The structure of transmission is of time slots (representative few show at 302 and 304) of appropriate duration assigned to the different bi-directional links (e.g., A-L, L-A, E-C, C-E, and so forth) across the network. Each bi-directional link transmits for its scheduled time duration and repeats the transmission after every $T_{REP}$. As shown in the figure, each link has its own periodic transmission, which could be dithered from every other link's transmission in the network. Thus, there is no explicit frame structure. To help ensure QoS, every link should transmit ($R_{voice}*T_{REP}$) hits in both directions (e.g., exchange a total of [$2*R_{voice}*T_{REP}$] information bits). Based on the operational data rate of the link $R_{OP}$, the time slot might be of duration ($2*R_{voice}*T_{REP}/R_{OP}$). Since there is no explicit frame structure, there is no fine tuned synchronization needed across the network, thus conforming to the low overhead distributed nature of ad hoc networks.

After identifying the path A-L-B, Node A 202 transmits a Request-to-Reserve (RTR) control packet 306 on a common code to intermediate Node L 206. RTR packet 306 should contain the resource reservation table of Node A 202. Initially, the reservation table for Node A 202 is empty, thus, there are no constraints on the transmission A-L, from the perspective of Node A 202. Node C 208 can hear and interpret the RTR packet 308 but does not perform any functions (e.g., interpret, update table, and the link) with regard to RTR packet 306.

A reservation table should be maintained at each node. The table can be considered an extension of a Network Allocation Vector (NAV) utilized in the IEEE 802.1.1 scheme. The reservation table encodes the appropriate node with knowledge concerning other active node (e.g., nodes that are receiving, transmitting, or scheduled to perform either function) within the node's vicinity. For every active node in the vicinity of a particular node, the reservation table contains the active node (s) schedule (e.g., time slots of transmission), interference margin M(j), power of transmission, and the path loss from active node j to node i, $G_{i,j}$. Thus, reservation table i denotes the local scheduling and topology information included in every node within the vicinity.

At substantially the same time as receiving the packet. Node L 206 examines its reservation table and the reservation table of Node A 202, which was included in RTR packet 306. Node L 206 attempts to find a feasibility schedule for the communication A-L 302. To be feasible, an admission control policy can be accessed to verify various conditions (e.g., information about neighboring active nodes, other scheduled transmissions within network, transmission rates) of the schedule. For an initial transmission, the reservation tables of Node A 202 and Node L 206 are empty and, thus, the conditions are satisfied.

Node L 206 can choose the earliest Schedule for the communication A-L (during T1). Node L 206 updates its reservation table and sends to Node B 204 an RTR packet 308 that includes the updated reservation table. At substantially the same time as receiving the RTR packet 308, Node B 204 examines the reservation tables of Node L 206 and Node B 204 and attempts to find a feasible schedule. If a schedule 304 is found, Node B 204 responds with a reservation confirm (RC) packet 310 announcing the schedule L-B 304.

RC packets should be sent using the common code, which can allow the packets to be heard by neighboring nodes (e.g., Node E 210, Node C 208, and so on). Included in the RC packet can be an interference margin M of the node reception. The interference margin can allow nodes within the vicinity to determine whether such node may be able to schedule simultaneous communications. The RC packet should also contain a transmission schedule and power of the node. Such information allows nodes within the vicinity to determine an expected interference from a scheduled session.

At a substantially similar time as receiving the RC packet 310, Node L 206 sends an RC packet 312 to node A 204 announcing the schedule L-B 304 and the schedule A-L 302. Node A 202, at about the same time as receiving the RC packet 312 sends an RC packet 314 to Node L 206 announcing the schedule A-L 302.

Nodes in the vicinity (e.g., neighboring nodes, which are Node C 208, Node E 210, and Node D 212 in this example), update their respective reservation tables accordingly. The actual data transmission between Node A 202 and Node B 204 can proceed according to the determined schedule, illustrated at 316 and 318, at time T2.

Continuing the example. Node E 210 wants to start a session with Node D 212 through route E-C-L-D. Node E 210 sends an RTR packet 320 to Node C 208. The RTR packet 320 should contain the reservation table of Node E 210. Node C 208, aware of the communication A-L 3.16 and the communication L-B 318, can determine if the communication from node E 210 can be scheduled simultaneously. Assume that the transmission power for the communication C-E 322 disturbs the scheduled communication A-L 316 (at Node L 206, for example) but does not disturb the scheduled communication L-B 318. Therefore, Node C 208 can schedule E-C 322 simultaneously with L-B 318 and should communicate this information to Node L 206 in an RTR packet 322. If necessary, Node C waits, shown at 324, until Node L 206 is idle and sends RTR packet 322 when Node L 206 is ready to receive a communication. Node L 206 can schedule a communication C-L 326 and send an RTR packet 328 to Node D 212, Node D 212 can respond to the RTR packet 328 with an RC packet 330 announcing the schedule L-D 332. As illustrated, Node L 206 does not have enough time to respond with its RC packet. Therefore. Node L 206 waits until the next period T3 to send an RC packet 334. Node C 208 then sends an RC packet 336. Upon receiving RC packet, Node E 210 sends an RC packet 338. The data can now be sent along the scheduled path E-C-L-D.

For each active node in the neighborhood or vicinity of a subject device, the following entries for the reservation table of the subject device are sent; a transmit/receive flag, a schedule, a maximum tolerance interference, and a transmission power. The transmit/receive flag can indicate whether the neighboring node is a transmitter or receiver for the link being described, and can be around one byte in length. The schedule can include the start time and duration of the neighboring node's activities (e.g., reception, transmission). The schedule can be around two bytes using char and time slotting. The maximum tolerable interference (M) of neighboring node, denoted by M(u) is during neighboring node reception and can be around one byte in length. This is the maximum addition interference that neighboring node can tolerate from an interfering node, such as subject device (advertised by neighboring node). These entries can be computed utilizing information advertised by neighboring nodes in their respective reservation control packets and by measuring the signal strength of such control packets. The transmission power of neighboring nodes during scheduled transmission can be approximately one byte in length.

It should be noted that the address of a neighboring device (which can be around six bytes) and the address of a destination node (which can be about six bytes in length) can be contained in the reservation table entry, but does not have to be sent in the RTR packet. Thus, the reservation table entry can include around five bytes of data.

Since RTR packets contain the reservation table, the RTR packet is of variable length, in addition, RTR packets can contain the following fields: sender address (around six bytes); receiver address (MacDes) (which can be approximately six bytes): about one-byte that contains the packet type, and a field around one-byte that includes the number of entries.

An estimated size of an RTR packet can be around or above seven bytes, not including the number of entries in the reservation table, the Physical header, and preamble. For a link that hears or observes two other nodes with two transmissions, utilizing the estimates noted with respect to the reservation table provides that each RTR packet can have a total size of thirty-four bytes (14+(4*5)), not including the PHY header (24 bytes), and preamble (10 micros). This can represent an overhead of 3.03 ms at 153.6 Kbps and 0.98 ms at 500 Kbps. Thus, a transmitter should know the best rate to send the RTR packet to minimize overhead. However, since the rate is generally determined after a successful RTR reception, the RTR's can be sent at $R_{min}$ since a link should be able to at least support this rate.

The RC packet can be of fixed length and have a relatively small overhead. For illustration purposes, assume Node B 204 has received an RTR packet from Node A 202 and that Node B 204 wishes to respond with an RC packet. Node B 204 would include various fields in its RC packet including a start and end of transmission field, which can be about two bytes. A source address field is also included that identifies the call and can be around six bytes as well as a sender address field that can be about six bytes and can identify the sender of the link. The RC packet also includes a destination address field that is around six bytes in length. Also included in the RC packet are interference margins and transmit powers at sender and receiver (around four bytes), a one-byte field (approximately) that contains the packet type and an (approximately) one-byte field with the number of entries. It should be noted that the RC packet is around twenty-six bytes, not including the PHY header (24 bytes) and preamble (10 micros). This represents an overhead of 2.5 ms at 153.6 Kbps and 0.77 ms at 500 Kbps.

It should be noted that nodes do not need to have the same time references. For example, when Node A 202 sends its reservation table including in the RTR packet to Node B 204, the time duration values included in the reservation table are with reference to the transmission time of the first RTR bit at Node A 202. Assuming that the propagation time is negligible (e.g., less than 1 microsecond), this time is substantially similar to the reception time of the first bit at Node B 204. Each, link should have its own reference period (e.g., 20 ms). Since the network is connected through the vicinities of links, clock drifts should not exceed several microseconds every renewal reservation period.

Figure 4:
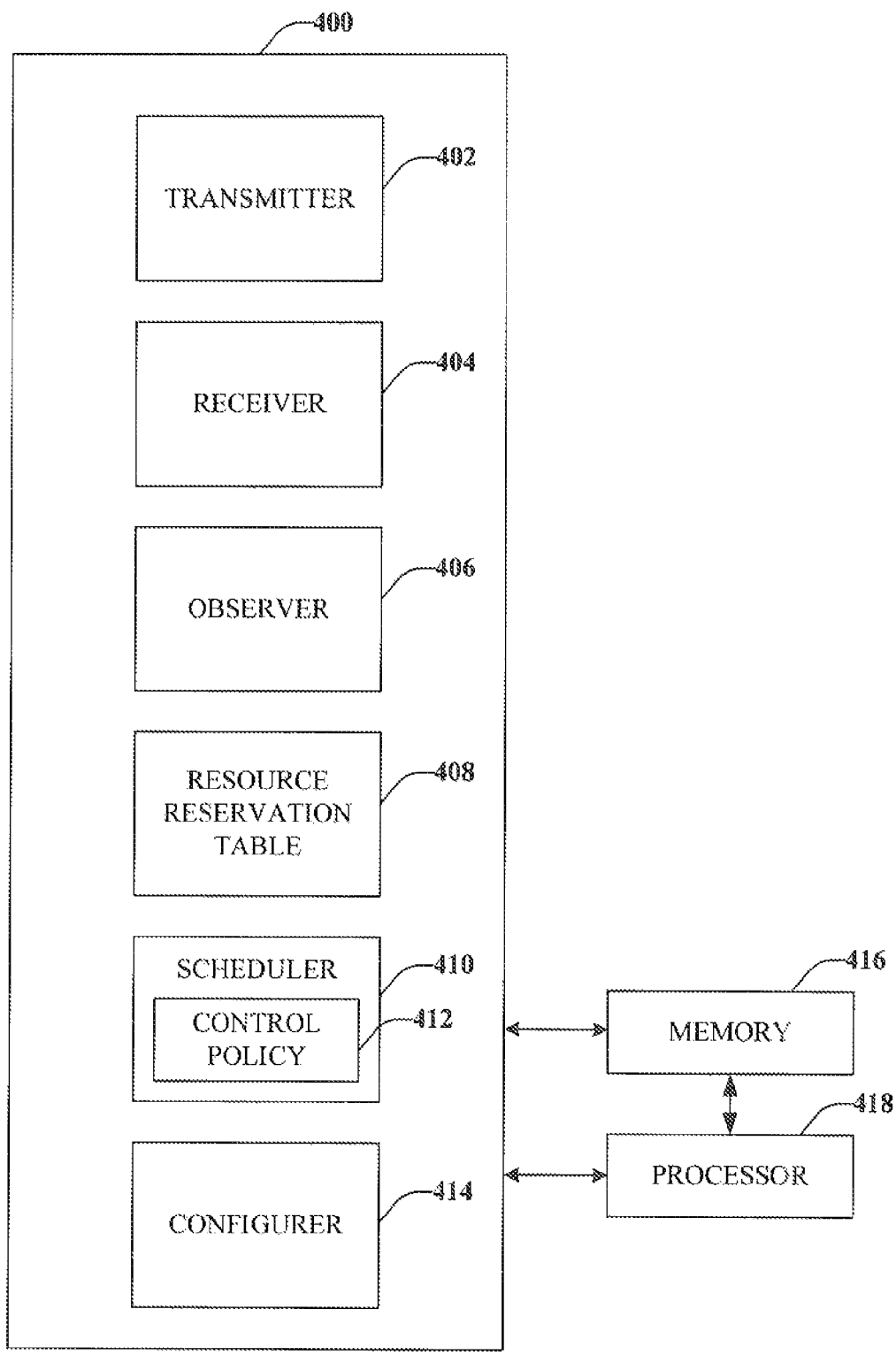
FIG. 4 illustrates a wireless device in accordance with the disclosed embodiments

FIG. 4 illustrates a wireless device 400 in accordance with the disclosed embodiments. It should be noted that wireless device 400 can be a source device, a destination device, or an intermediate device or node along a communication path and is not limited to one particular function. That is to say, along the communication path a wireless device can perform multiple functions at substantially the same time.

Wireless device 400 includes a transmitter 402 that can be configured to send, and a receiver 404 that can be configured to receive, a communication (e.g., voice, data, text, image, video, and the like), an RC packet, and an RTR packet. Such transmission, receipt, or both can occur at different times or at substantially the same time, depending on the traffic occurring in the communication network.

An observer 406 can be configured to observe or monitor traffic of a neighboring device. For example, a neighboring device can send, receive, or both send and receive, RC packets, RTR packets, or both packets. Observer 406 can observe such traffic and the packets that are sent utilizing a common code can be understood by observer 406. Such packets can include reservation tables associated with neighboring devices, scheduling of communication between neighboring devices, or other information that can be utilized by wireless device 400 to schedule communications within network.

Also included in wireless device 400 is a resource reservation table 408 that can be an extension of a NAV. Reservation table 408 can encode wireless device 400 with information regarding neighboring nodes that are active (e.g., receiving, transmitting, and the like). Such information can include schedules (e.g., time slots of transmission), interference margin $M(j)$, power of transmission, path loss, and other information, that allows reservation table 408 to have information regarding the local topology and scheduling of neighboring nodes.

A scheduler 410, included in wireless device 400, can be configured to determine a scheduling based in part on information included in a received RTR packet. Such information can include scheduling of neighboring devices. Scheduler 410 can further be configured to analyze the available schedules and choose the earliest communication for the subject link in the communication path. An admission control policy 412 can be configured to determine if the chosen schedule meets certain criteria or is feasible. The schedule or feasibility of the link can be communicated to a transmitting node through transmitter 402. A configurer 414 can be included that can configure or append information to a message, packet, or both, prior to such message or packet being transmitted to a neighboring device.

RTR packets can be considered call setup packets and should be successfully received, therefore, the transmission of an RTR can be scheduled as though it were a DATA packet. If this is not possible, the RTR can be sent even if it might cause interference to ongoing communications (e.g., voice transmissions). In some embodiments, an intelligent mechanism may be needed due to the size of RTR packets and the lack of rate information prior to transmission. In some embodiments, a node could passively verify that its receiver has sent its own RTR packet to reserve the next hop in the path. The ability of RTR packets to get though should be checked.

RCs can be handled by an intelligent mechanism since they are smaller packets and before the RC transmission the rate supported by the link is known. Thus, the RC can be transmitted in the same slot in which it confirms the reservation. For example, if Node B responds to Node A's RTR with an RC packet that has a reservation entry that allows for data transmission between Node A and Node B from, for example, 0 ms to 5 ms, the RC can be sent in this slot. This is possible when the RC size is less than the DATA packet size.

Memory 416 can be operatively coupled to wireless device 400. Memory 416 can store information related to a reservation table and a schedule of wireless device, reservation tables or scheduling of neighboring devices, or other information regarding traffic and devices within the communication network. A processor 418 can be operatively connected to scheduler 410 (and/or memory 416) to facilitate analysis of information related to scheduling communications. Processor 418 can be a processor dedicated to analyzing and/or generating information received by receiver 404 or scheduler 410, a processor that controls one or more components of wireless device 400, and/or a processor that both analyzes and generates information received by receiver 404 and controls one or more components of wireless device 400.

Memory 416 can store protocols associated with generating acknowledgments in according with an ACK/NACK protocol, reducing interference, scheduling communications, taking action to control communications between a source and a destination device, and the like, such that wireless device 400 can employ stored protocols and/or algorithms to achieve improved communications in a wireless network as described herein. It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 416 of the disclosed embodiments are intended to comprise, without being limited to, these and other suitable types of memory.

Wireless device 400 can also include an encoder (not shown) that cm modulate and/or encode signals in accordance with a suitable wireless communication protocol (e.g., OFDM, OFDMA, CDMA, TDMA, GSM, HSDPA, . . . ), which signals can then be transmitted to a destination device. Encoder can be a voice coder (vocoder) that utilizes a speech analyzer to convert analog waveforms into digital signals or another type of encoder.

Also included in wireless device 400 can be a decoder component (not shown) that can decode a received signal and/or data packet therein for processing. Upon successful decode of a data packet, an acknowledgment (ACK) component (not shown) can generate an acknowledgment that indicates successful decode of the data packet, which can be sent to a source device (through transmitter 402) to notify source device that the data packet was received and decoded, and therefore should not be retransmitted.

Figure 5:
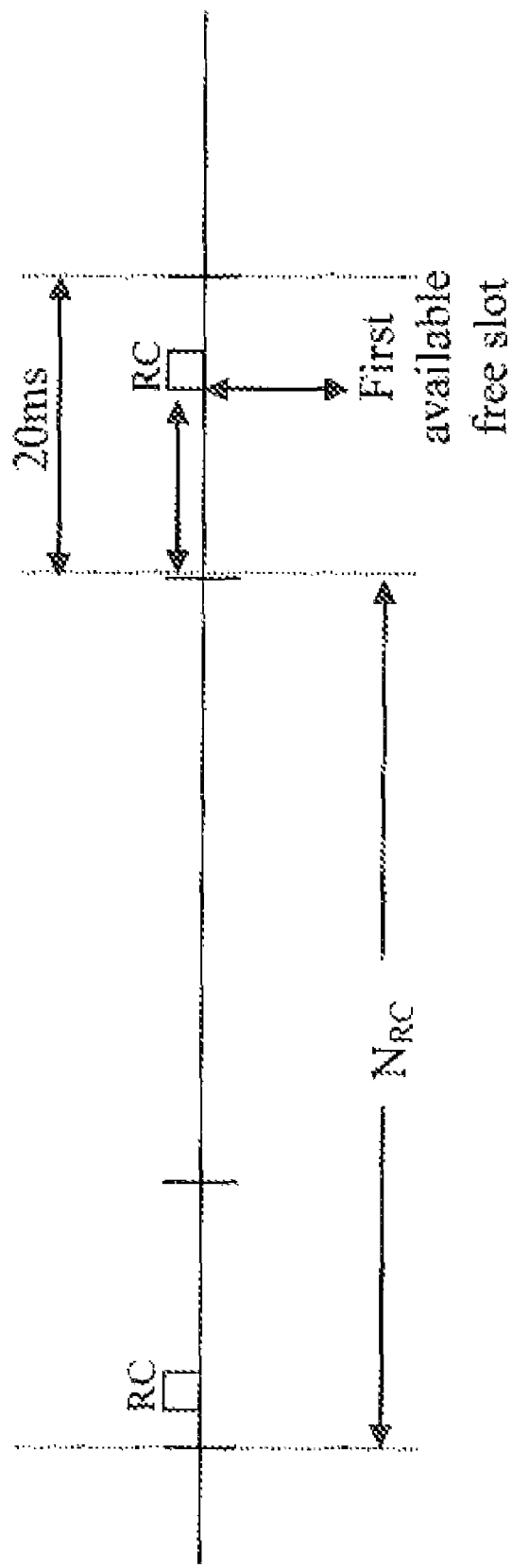
FIG. 5 illustrates a reservation renewal timeline in accordance with the disclosed embodiments.

FIG. 5 illustrates a reservation renewal timeline 500 in accordance with the disclosed embodiments. The routes of the reserved session are subject to QoS violations due to various factors including mobility, channel behavior, node failures, and the like. Thus, efficient resource release mechanisms can free the reserved resources at each node when the existing reserved routers are no longer used. In addition, reservation tables that might be outdated at terminals or wireless devices should be removed. A reservation renewal mechanism can be employed whereby the reservation request should be renewed at a predetermined interval or upon request. If a node does not receive a new reservation renewal packet for a session beyond the predetermined interval, the information corresponding to that reservation is considered to be treed or removed.

Each reservation entry should have a duration of validity and after the expiration of this duration it is purged from the reservation table. The RC renewal (RC update) packets should be sent once every $N_{RC}$ period, which can be, for example, 20 ms or another interval. The interval can depend on how frequently new-links enter the network. Early termination periods (e.g., periods of time remaining in the scheduled time interval after the data has been transmitted successfully) can be utilized for RC renewal. In such a manner when a link early terminates, the resources are free and it is a schedule slot, which can mitigate the occurrence of it interfering with outgoing transmissions.

The RC renewal period $N_{RC}$ is illustrated at 502, which can be a predetermined interval beginning at approximately the same time a new RC 504 is available. At the expiration of the predetermined interval 506 (e.g., periodic RC renewal timer), the node is ready to transmit its RC renewal 508, which should be scheduled in the first available free slot 510. At substantially the same time, the timer is reset, shown at 512.

If a link early terminates, the transmitter will make a determination whether there is enough time to transmit the RC renewal packet. Time might be available since RC renewal is sent at a high rate. A secondary check is then performed if the current time is within a predetermined margin, such as 20 ms, for example, of the RC renewal timer expiration. If this is true, the RC renewal is sent in the early termination time and the timer is reset. A random dither can be added to the renewal period, that can mitigate that there is no potential interferer that is consistently starved of RC renewals. Potential interferers, for example, may be busy when the RC renewal is sent and the random dither can help provide the RC renewals to such interferers.

Similar to RTR packets, the overhead of the RC updates (RC renewals) can be calculated. In the case of RC updates (RC renewals), the RC update (RC renewal) packet should be fit into the early termination region and should be small. RC updates (RC renewals) should including the following fields per entry. A destination field, which is about six bytes. RC updates (RC renewals) provide information about links in which the source is the node, therefore, the source address is not needed. A start time and end time should be included and is about two bytes. A transmitter power and interference margin, which is about two bytes, should also be provided.

The following information can also be included for each entry. A sender address that is approximately six bytes. A receiver address (MacDes), which can be about six bytes. Approximately a one-byte field that contains the packet type and about a one-byte field that includes the number of entries. Therefore, the RC update (RC renewal) size of a node with four entries is 54 bytes (14+(4*10)). This does not include the PHY header (around 24 bytes) and preamble (about 10 micros). Tire RC update (RC renewal) rate is set to be $R_{RC}$ which can be approximately 1 Mops, which presents an overhead of 0.625 ms.

In view of the exemplary systems shown and described above, methodologies that may be implemented in accordance with the disclosed subject matter, will be better appreciated with reference to the flow charts of FIGS. 6-9. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with, the blocks may be implemented by software, hardware, a combination thereof or any other suitable means (e.g. device, system, processor, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
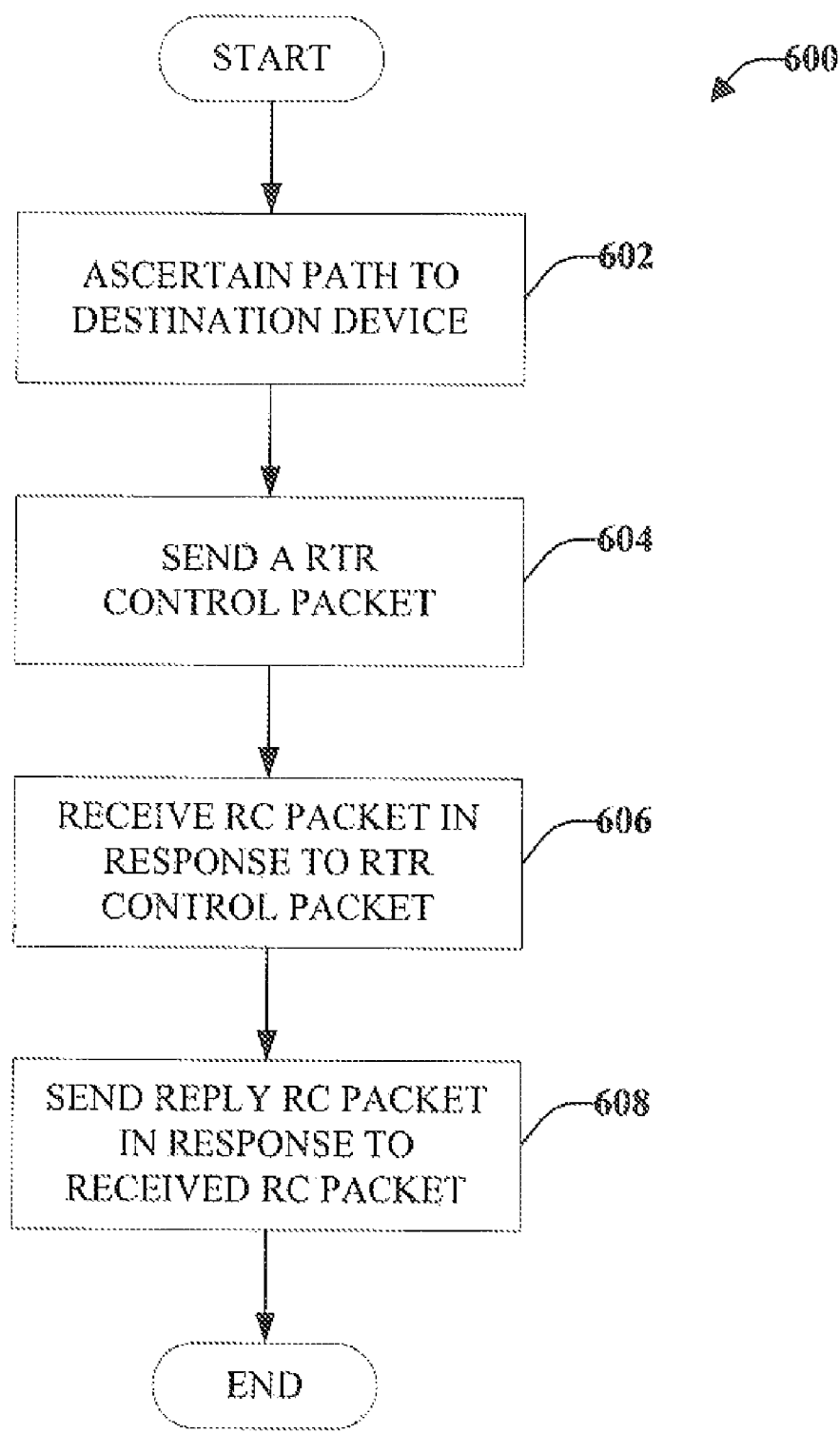
FIG. 6 illustrates a methodology for establishing QoS voice calls in an UWB ad hoc network.

FIG. 6 illustrates a methodology 600 for establishing QoS voice calls in an UWB ad hoc network. Method 600 starts, at 602, where a path to a destination device is ascertained. This path is a communication path between a source device (e.g., wireless terminal) and the intended recipient of the communication (e.g., wireless terminal or destination device). The path selected should have enough resources (e.g., coarse estimate found by the routing protocol) to establish the session between the source device and the destination device. The path between the devices can include a common node or intermediate device(s). At 604, a Request-to-Reserve (RTR) control packet is sent to the intermediate device. The RTR packet can contain a reservation table of the source device. The reservation table is initially empty, thus there are no constraints on the transmission from the source device to the intermediate device from the perspective of the source device.

At 606, a response to the RTR control packet in the form of a reservation confirmation (RC) packet is received from the intermediate device. The RC packet provides the scheduling through the intermediate device. In response to the RC packet, at 608, a RC packet is sent to the intermediate device announcing the schedule from the source device to the intermediate device. Such an RC packet can include an interference margin M of the source device, reception and/or a transmission schedule, and power of the source device.

Figure 7:
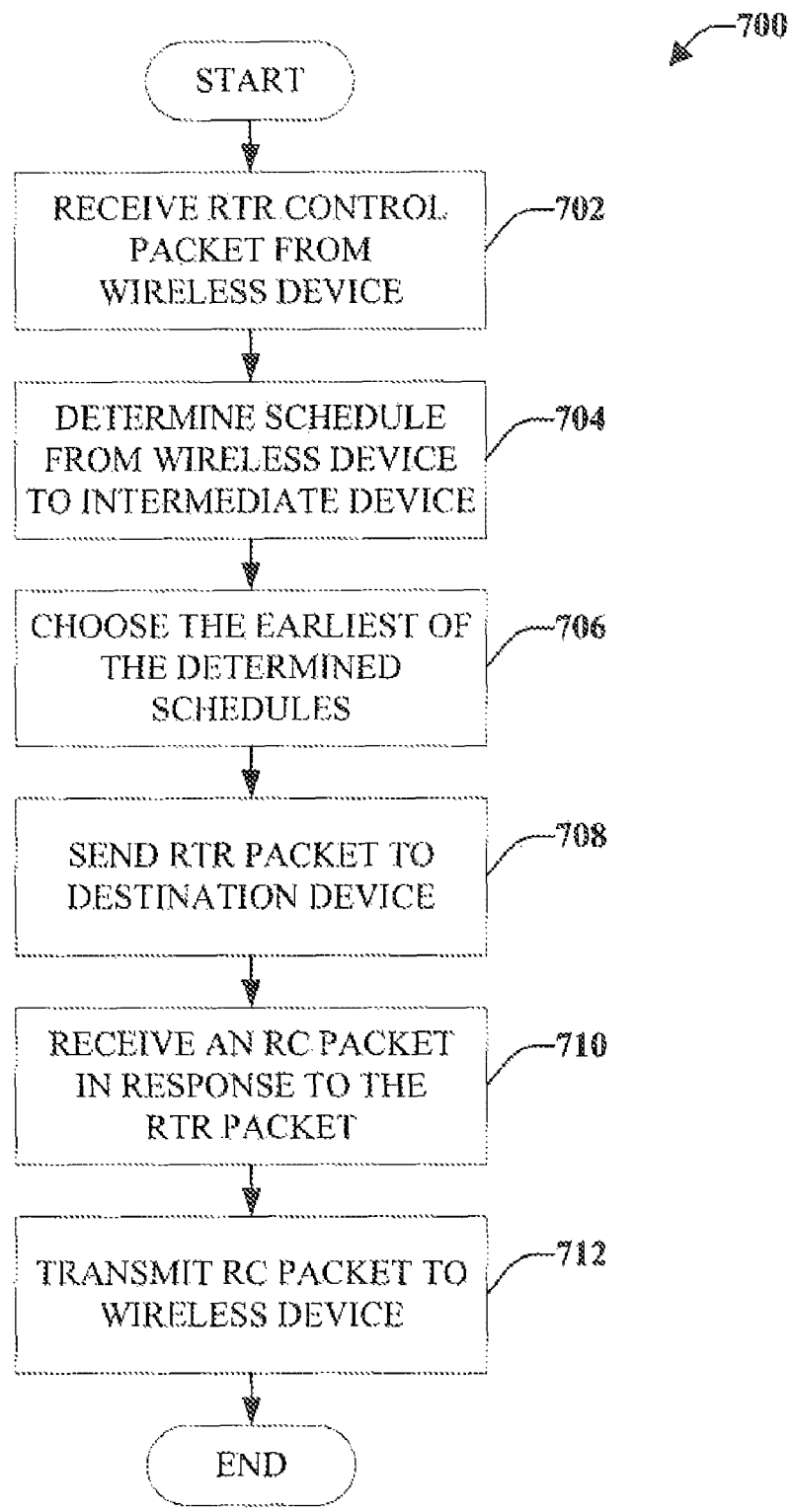
FIG. 7 illustrates a methodology for scheduling communications in an ultra wideband ad hoc communications network.

FIG. 7 illustrates a methodology 700 for scheduling communications in an ultra wideband ad hoc communications network. Method 700 starts, at 702, if a RTR control packet is received at an intermediate device from a wireless device. The packet can be received from a wireless device (e.g., source device) that desires to communicate with another device (e.g., destination device), and the communication is accomplished through interaction with an intermediate device. The RTR packet contains a reservation table of the wireless device, which is initially empty or has a null value.

At 704, the RTR packet is examined and a schedule between the wireless device and the intermediate device is determined. The schedule can be a feasibility schedule, wherein an admission control policy is verified for certain conditions, such as other communications occurring in the network at substantially the same time. Since initially both the reservation table of the wireless device and the reservation table of an intermediate device are empty, conditions should be satisfied. A number of schedules can be found and, at 706, the earliest schedule for the communication between the wireless device and the intermediate node is chosen. At substantially the same time as choosing the earliest schedule, the intermediate node updates its reservation table and, at 708, sends an RTR packet to the destination device.

The method 700 continues, at 710, if an RC packet is received from the destination device in response to the sent RTR packet. The RC packet notifies the intermediate device of the schedule between the intermediate device and the destination device. The RC packet, is sent utilizing a common code, which allows neighboring devices to hear and interpret the packet. At 712, an RC packet (common code) is sent to the wireless device announcing the schedule between the wireless device and the intermediate device.

Figure 8:
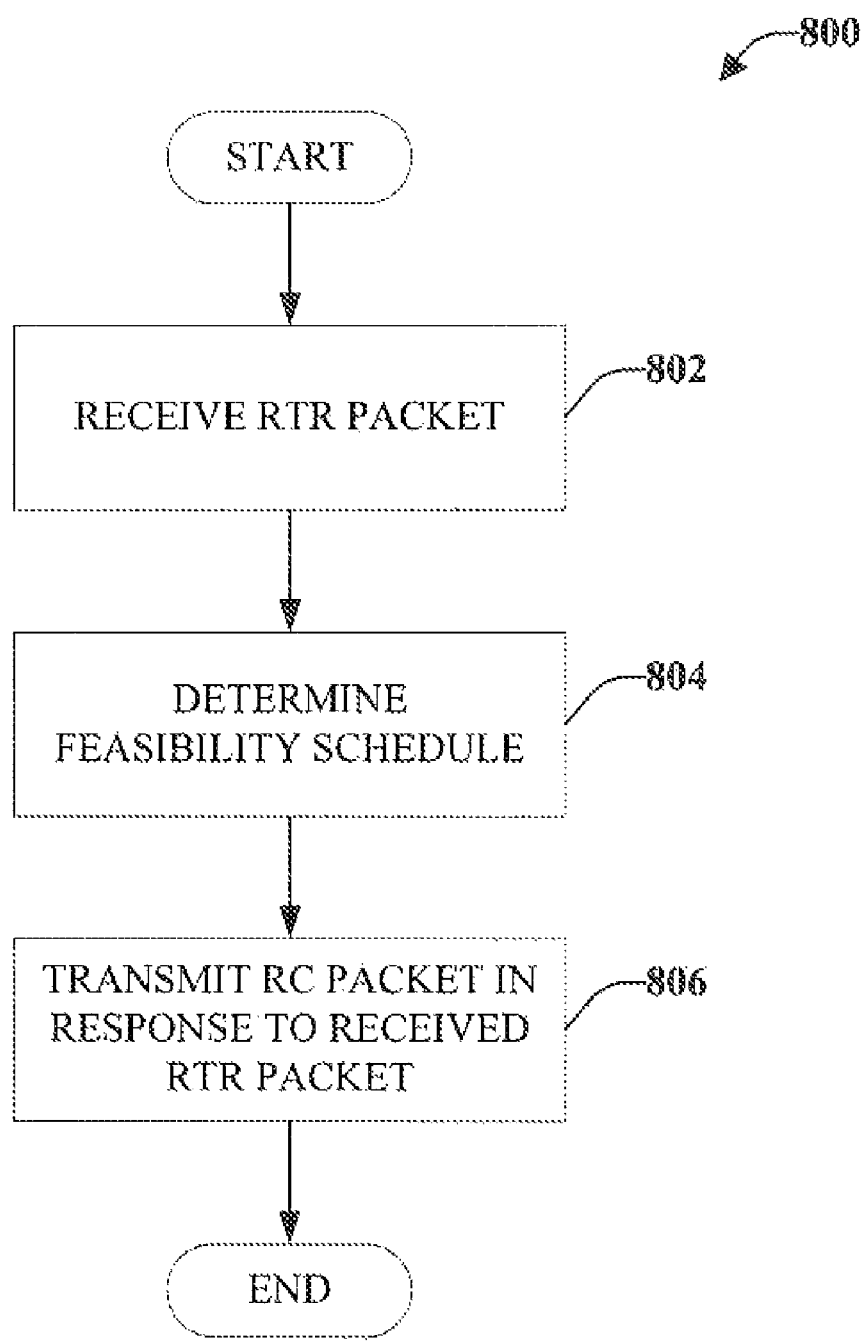
FIG. 8 illustrates a methodology for scheduling ultra wideband ad hoc communications.

FIG. 8 illustrates a methodology 800 for scheduling ultra wideband ad hoc communications. The method 800 begins, at 802, if an RTR packet is received at a destination device. The RTR packet can be received from an intermediate device through which communication from a source device is routed. The RTR packet contains a reservation table for the intermediate device that includes the earliest schedule for a communication between the source device and the intermediate device.

Continuing, at 804, the RTR packet is examined and a reservation table of the intermediate device and a reservation table of the destination device are examined to determine a feasibility schedule. At 806, a reservation confirmation (RC) packet is transmitted to the intermediate device in response to the RTR packet received. The RC packet announces the schedule between the intermediate device and the destination device. The RC packet should be sent utilizing a common code in order for neighboring device to understand the information contained in the packet.

Figure 9:
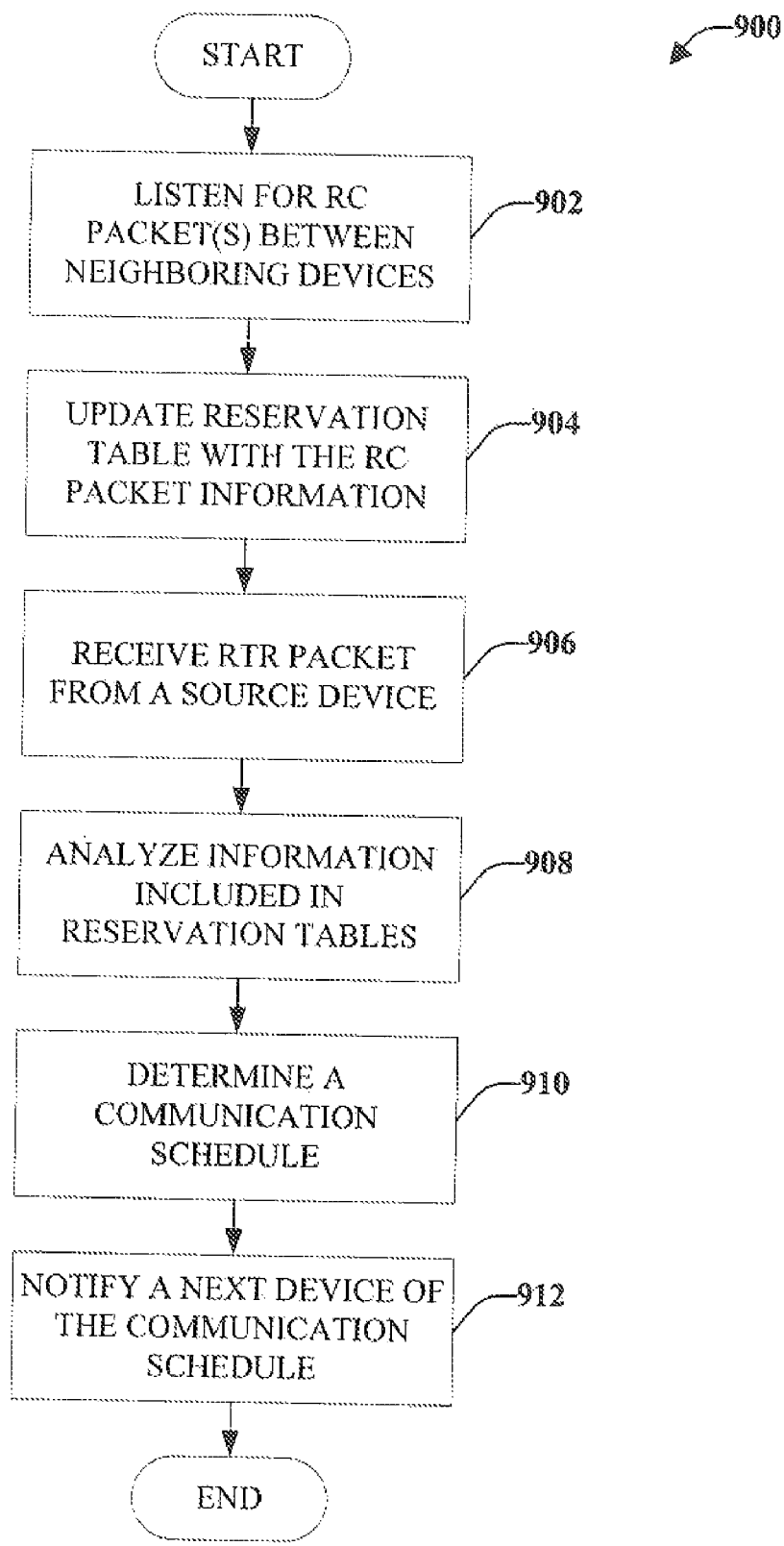
FIG. 9 illustrates a methodology for scheduling a communication based in part on information, exchanged between neighboring devices.

FIG. 9 illustrates a methodology 900 for scheduling a communication based in part on information exchanged between neighboring devices. The method 900 starts, at 902, with devices listening for communication between neighboring devices. Such communication can include RC packets sent using a common code. RC packets can include, for example, an interference margin of a node reception, a transmission schedule and power of the node, or both. A device that hears the communication can determine if it can schedule communication simultaneously or not based on the interference margin. The device can determine an expected interference from a scheduled session based on the transmission schedule and power of the node. At 904, a reservation table of an intermediate device is updated to include the information included in the RC packet of the neighboring devices.

At 906, an RTR packet is received from a source device that wishes to communicate to a destination device through one or more intermediate devices. A reservation table included in the RTR packet and the updated reservation table of the intermediate device are analyzed, at 908. Based in part on such analysis, a communication schedule is determined, at 910, which satisfies the feasibility conditions. These feasibility conditions include whether there is enough time slots to support the session, that the interference caused by the new session being calculated is less than the interference margin of all the ongoing sessions already scheduled, that the session being scheduled can operate successfully with the interference from already scheduling ongoing sessions, and that the session can support a minimum rate of at least $R_{min}$. Such communication schedule can be based in part on a scheduled communication between neighboring devices and whether a transmission power between the source device and the intermediate device would disturb a communication between the neighboring devices. A next device (e.g., an intermediate device, a destination device) can be notified of the communication schedule, at 912.

With reference now to FIGS. 10-13, illustrated are systems that are represented as functional blocks or logical modules. These function blocks represent functions implemented by a processor, software or combination thereof (e.g., firmware). Systems can reside in an access point or in a user device.

Figure 10:
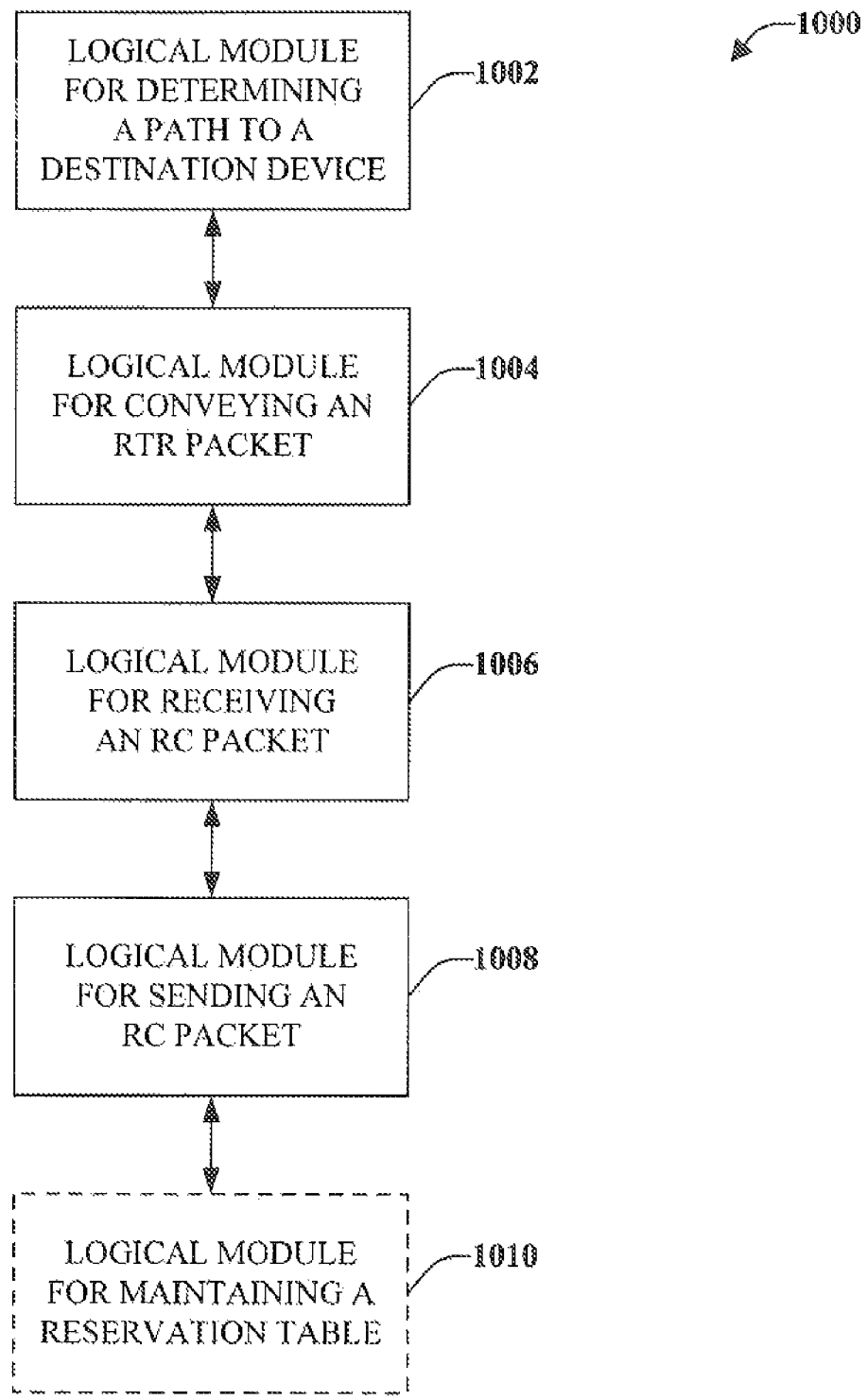
FIG. 10 illustrates a system for establishing QoS communications in an UWB ad hoc network.

FIG. 10 illustrates a system 1000 for establishing QoS communications in an ad hoc network. System 1000 includes a logical module 1002 for determining a path to a destination device. The path can originate at a source device find traverse through multihops along the path until a destination device is received. A logical module 1004 for conveying an RTR packet to a first device is also provided. The first device can be a device (e.g., wireless terminal, node, base station) located along the path between the source device to the destination device. The RTR packet can include a reservation table that includes scheduling information and information about active neighboring nodes.

System 1000 also includes a logical module 1006 for receiving an RC packet. This RC packet can be received in response to the conveying RTR control packet and should include communication scheduling information. A logical module 1008 for sending a reply RC packet is included. Such logical module 1008 can send the RC packet to confirm the schedule received in response to the RTR control packet.

In accordance with some embodiments, an optional logical module 1010 is included that can maintain a resource reservation table that includes neighboring device information. Such logical module 1010 can automatically update the resource reservation table when updated information is received from an active neighboring device or when new scheduling information is available.

For example, an apparatus can include a means for determining a path to a destination device, which can be logical module 1002, and a means for conveying an RTR packet to a first device, which can be logical module 1004. A means for receiving an RC packet that comprises a schedule in response to the conveyed RTR control packet, which can be logical module 1006, and a means for sending a reply RC packet in response to the received RC packet, which can be logical module 1008, can also be included in apparatus.

Figure 11:
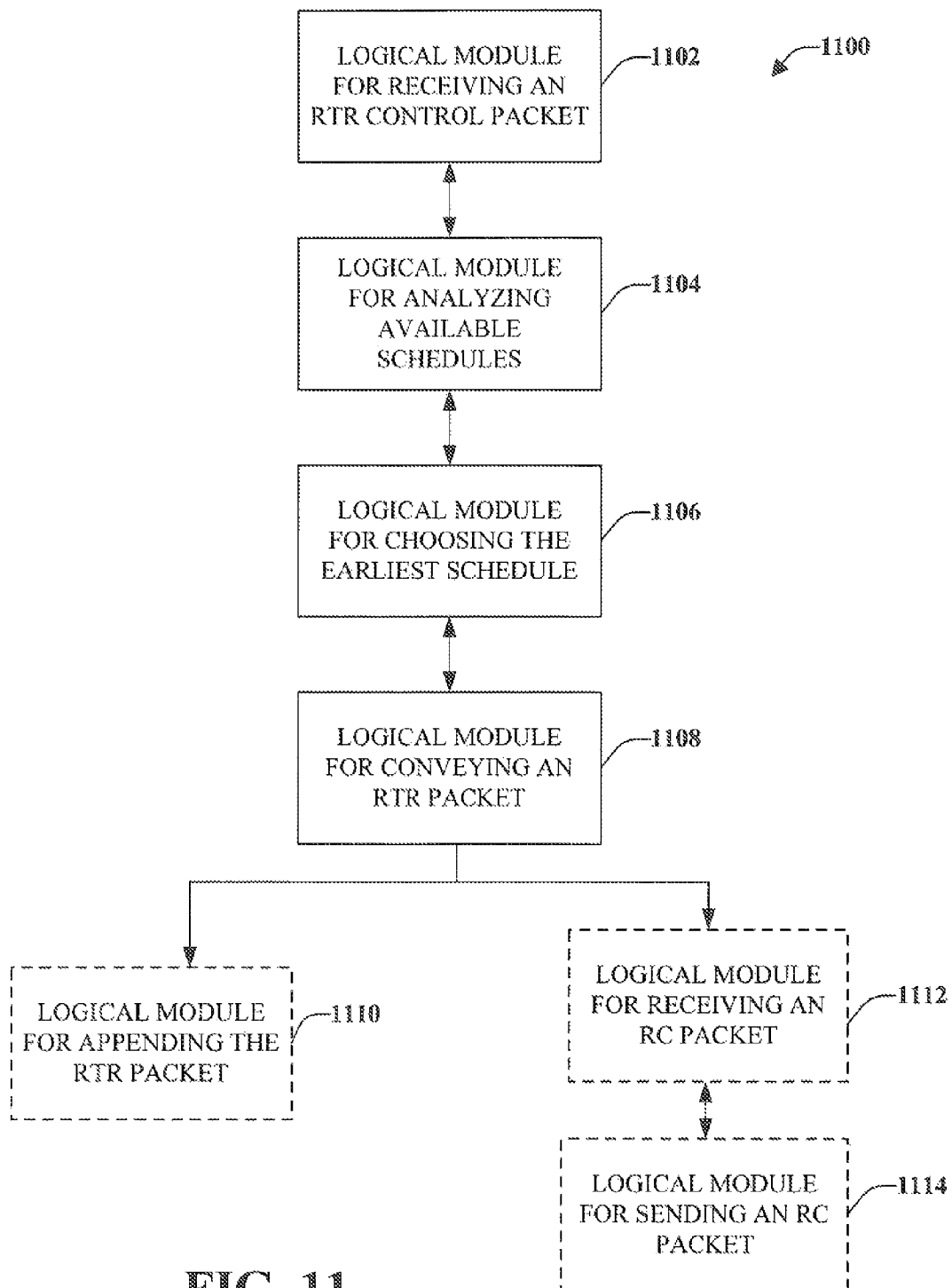
FIG. 11 illustrates a system for scheduling communications in an ultra wideband ad hoc communications network.

FIG. 11 illustrates a system 1100 for scheduling communications in an ad hoc communications network. System 1100 can include a logical module 1102 for receiving an RTR control packet. The RTR control packet can include path information for a path between a source device and a destination device. A logical module 1104 can analyze available schedules for the path and a logical module 1106 can choose the earliest schedule for the communication. Also included in system 1100 is a logical module 1108 for conveying an RTR packet to the destination, device. The RTR packet should include information regarding the earliest schedule.

In accordance with some embodiments system 1100 also includes a logical module 1110 for appending the RTR packet, with a first reservation table for a first intermediate device located along the path and a second reservation table for the source device. Some embodiments include a logical module 1112 for receiving a first RC packet from the destination device. The RC packet includes a communication schedule. Also included can be a logical module 1114 for sending a second RC packet to the source device. The second RC packet can include the communication schedule.

For example, an apparatus that schedules communications in an ad hoc communications network can include a means for receiving an RTR control packet that includes a path from a source device to a destination device, which can be logical module 1102. Also included can be a means for analyzing available schedules for the path, which can be logical module 1104. A means for choosing the earliest schedule, which can be logical module 1106, and a means for conveying, an RTR packet to the destination device, which can be logical module 1108, can also be included in the apparatus.

Figure 12:
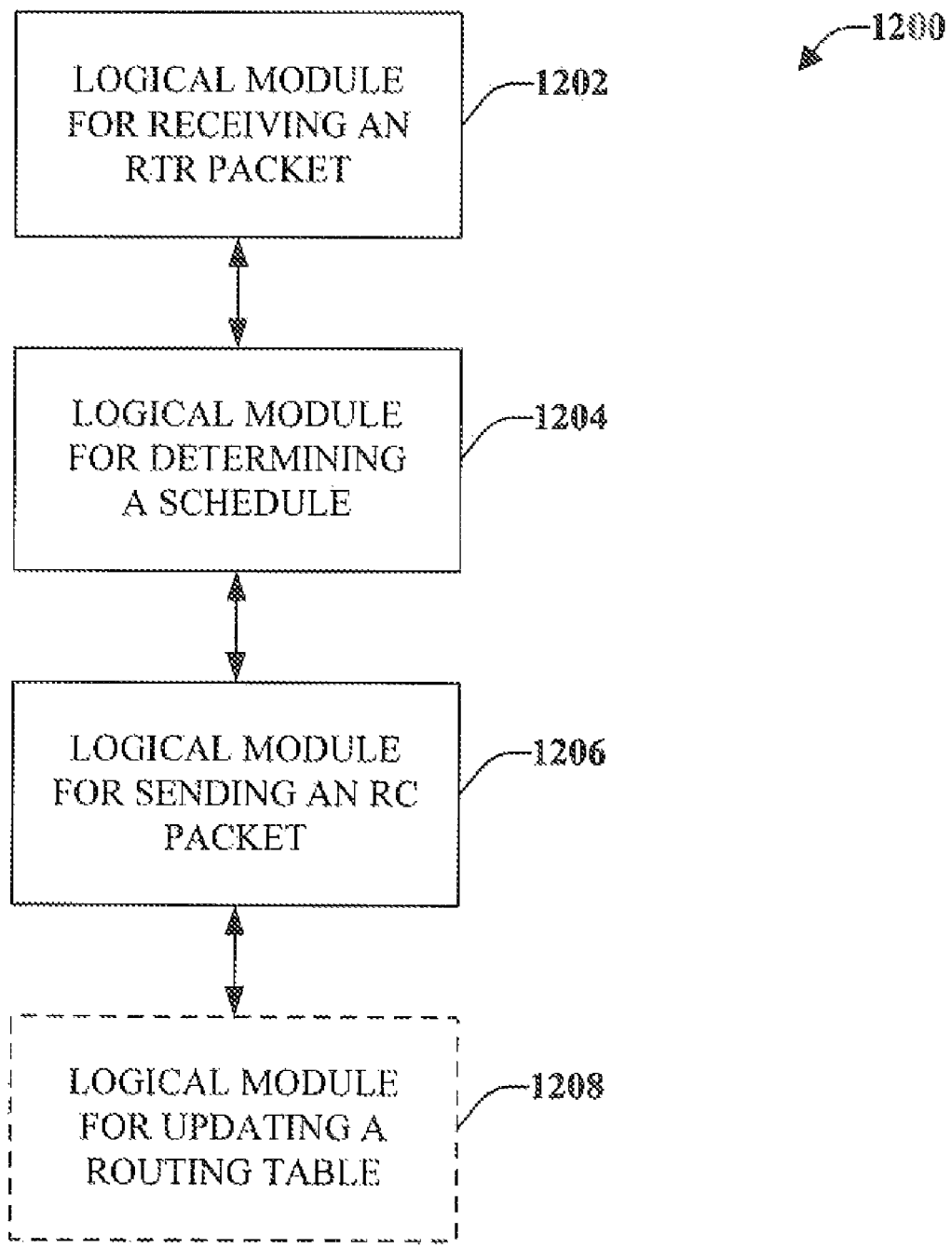
FIG. 12 illustrates a system for scheduling ultra wideband ad hoc communications.

FIG. 12 illustrates a system 1200 for scheduling ad hoc communications. System 1200 includes a logical module 1202 for receiving an RTR packet and a logical module 1204 for determining a schedule that does not interfere with at least one communication that is scheduled within a network. System 1200 can also include a logical module 1206 for sending an RC packet in response to the received RTR packet. The RC packet can include the schedule. According to some embodiments, system 1200 can include a logical module 1208 for updating a routing table with the schedule.

For example, an apparatus that schedules ad hoc communications can include a means for receiving an RTR packet, which can be logical module 1202. Apparatus can also include a means for determining a schedule that does not interfere with at least one communication that is scheduled, which can be logical module 1204, and a means for sending an RC packet in response to the received RTR packet, which can be logical module 1206.

Figure 13:
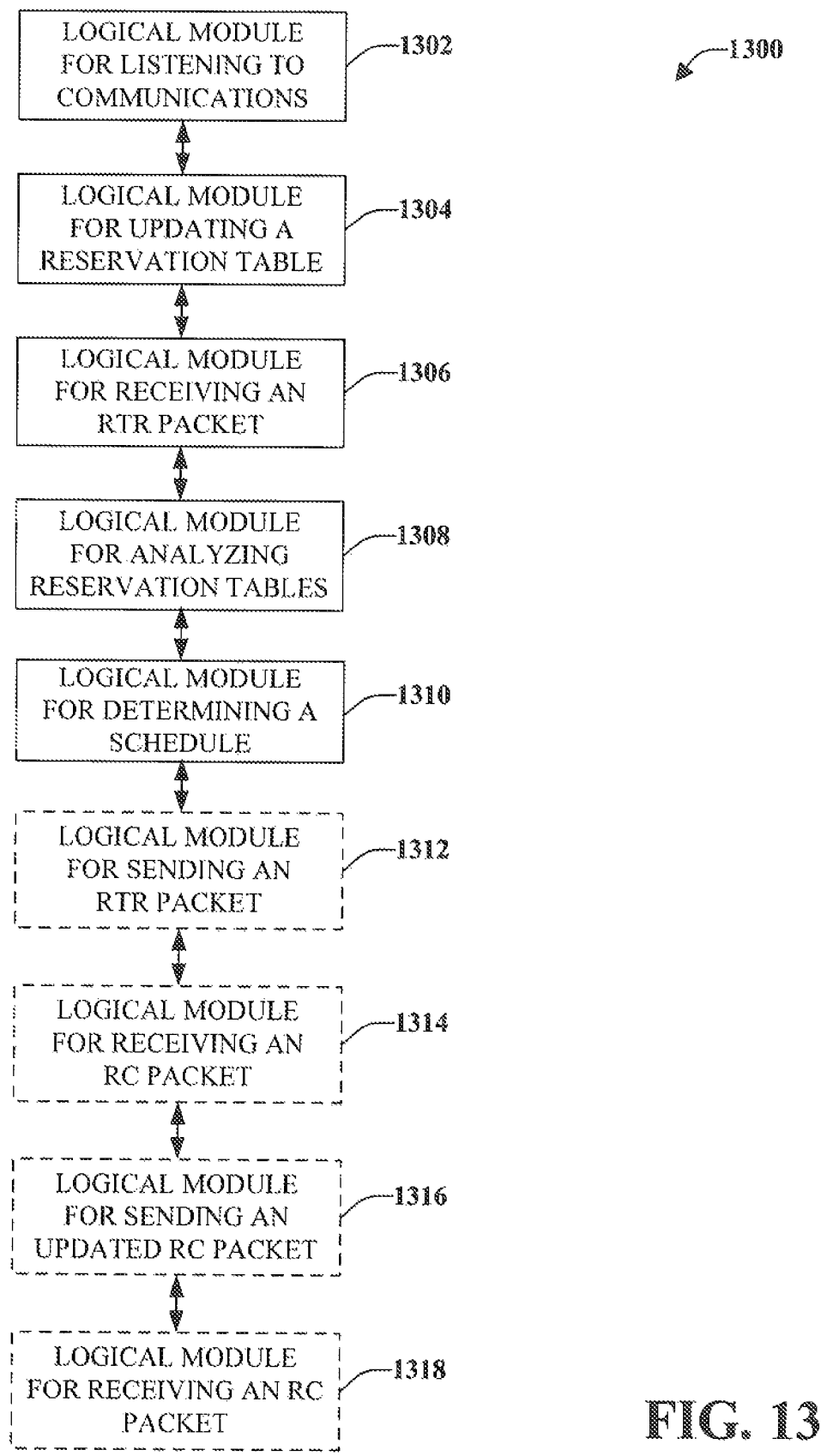
FIG. 13 illustrates a system for scheduling communications in a multihop ad hoc network.

FIG. 13 illustrates a system 1300 for scheduling communications in a multihop ad hoc network. System 1300 can include a logical module 1302 for listening to communications between neighboring devices. The communications can include RC packets sent on a common code. Also included is a logical module 1304 for updating a routing table with information included in the communication and a logical module 1306 for receiving an RTR packet that contains a reservation table. A logical module 1308 for analyzing routing tables and a logical module 1310 for determining a communication schedule based in part on the routing tables can also be included.

In accordance with some embodiments, system 1300 further includes a logical module 1312 for sending an RTR packet that can include the communication schedule and a logical module 1314 for receiving, an RC packet, in response to the sent RTR packet. Also included can be a logical module 1316 for sending an updated RC packet to a source device and a logical module 1318 for receiving from the source device an RC packet in response to the sent RC packet.

For example, an apparatus can include a means for listening for RC packets communicated between neighboring devices, which can be logical module 1302, and a means for updating a reservation table of an intermediate device with information included in the RC packet, which can be logical module 1304. A means for receiving at a first intermediate device an RTR packet from a source device, which can be logical module 1306, can also be included. The RTR packet contains a reservation table of the source device. The apparatus can further include a means for analyzing the update reservation table and the source device reservation table, which can be logical module 1308, and a means for determining a communication schedule between the source device and a destination device based in part on the analyzed reservation tables, which can be logical module 1310.

Figure 14:
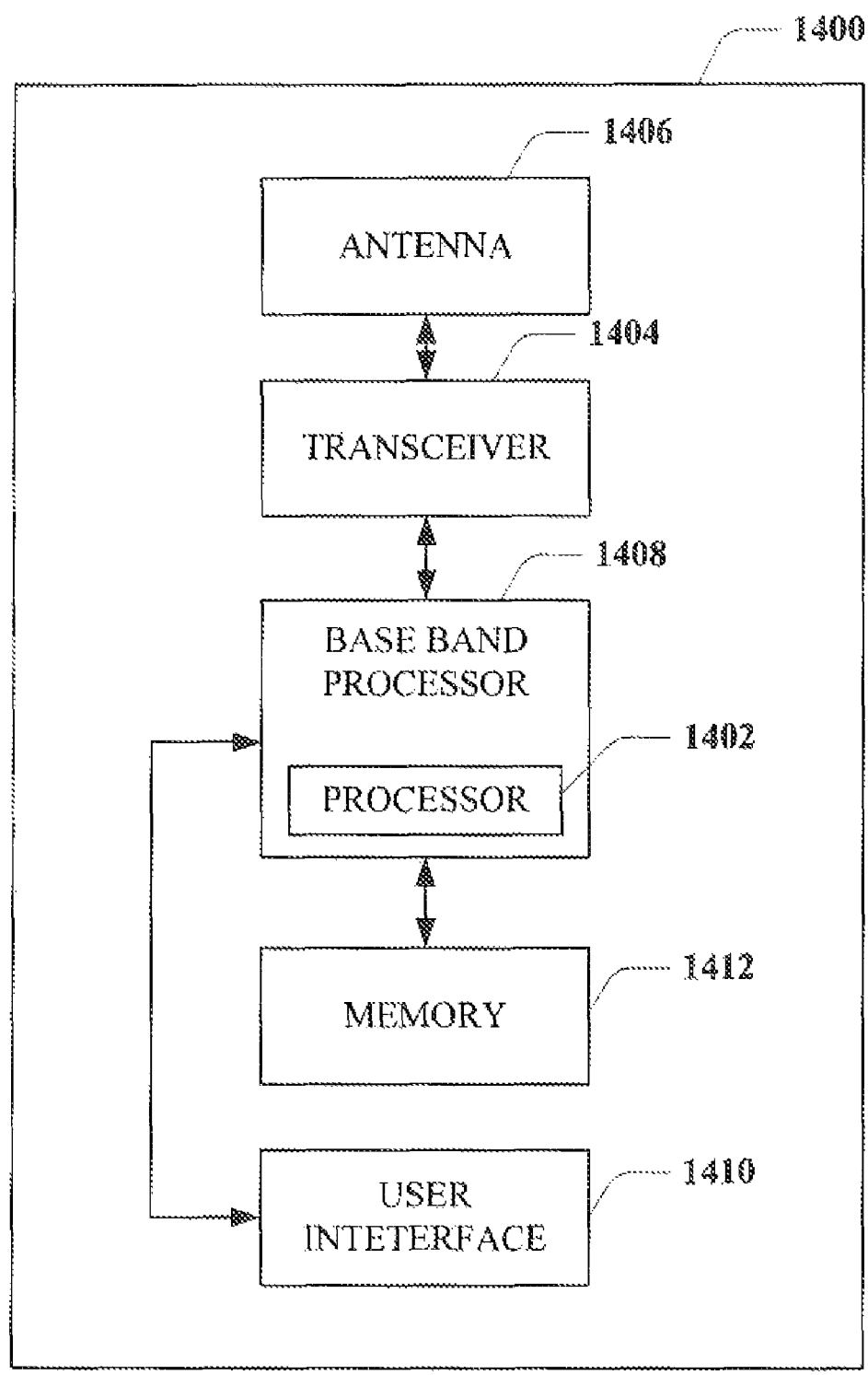
FIG. 14 illustrates a conceptual block diagram of a possible configuration of a terminal.

With reference now to FIG. 14, illustrated is a conceptual block diagram of a possible configuration of a terminal 1400. As those skilled in the art will appreciate, the precise configuration of the terminal 1400 may vary depending on the specific application and the overall design constraints. Processor 1402 can implement the systems and methods disclosed herein.

Terminal 1400 can be implemented with a front-end transceiver 1404 coupled to an antenna 1406. A base band processor 1408 can be coupled to the transceiver 1404. The base band processor 1408 can be implemented with a software based architecture, or other type of architectures. A microprocessor can be utilized as a platform to run software programs that, among other functions, provide control and overall system management function. A digital signal processor (DSP) can be implemented with an embedded communications, software layer, which runs application specific algorithms to reduce the processing demands on the microprocessor. The DSP can be utilized to provide-various signal processing functions such as pilot signal acquisition, time synchronization, frequency tracking, spread-spectrum processing, modulation and demodulation functions, and forward error correction.

Terminal 1400 can also include various user interfaces 1410 coupled to the base band processor 1408. User interfaces 1410 can include a keypad, mouse, touch screen, display, ringer, vibrator, audio speaker, microphone, camera and/or other input/output devices.

The base band processor 1408 comprises a processor 1402. In a software-based implementation of the base band processor 1408, the processor 1402 may be a software program running on a microprocessor. However, as those skilled in the art will readily appreciate, the processor 1402 is not limited to this embodiment, and may be implemented by any means known in the art, including any hardware configuration, software configuration, or combination thereof, which is capable of performing the various functions described herein. The processor 1402 can be coupled to memory 1412 for the storage of data.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment, may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for scheduling communications in an ad hoc communications network from at least a first wireless device to a destination device via an intermediate device, the method comprising:

receiving an RTR control packet at the intermediate device from the at least a first wireless device;

determining a schedule from the at least a first wireless device to the intermediate device;

choosing at the intermediate device an earliest schedule from among a plurality of schedules for communication between the at least a first wireless device and the intermediate device based on an admission control policy;

sending an RTR packet to the destination device;

receiving an RC packet from the destination device in response to the RTR packet; and transmitting the RC packet to the at least a first wireless device, the RC packet including a communication schedule.

2. The method of claim 1, after receiving an RTR control packet from the at least a first wireless device, further comprising appending the RTR packet with a first reservation table for the intermediate device and a second reservation table for the at least a first wireless device.

3. The method of claim 1, wherein the method is performed by the intermediate device.

4. The method of claim 1, wherein the admission control policy condition includes at least one of a data rate, a data delay, a Quality of Service, and a scheduled transmission.

5. The method of claim 1, wherein after choosing an earliest schedule for communication between the at least a first wireless device and the intermediate device, further comprising:

updating a reservation table of the intermediate device; and appending the RTR packet with the reservation table of the intermediate device.

6. The method of claim 1, further comprising using a common code to send the RTR packet and to transmit the RC packet.

7. The method of claim 1, wherein the received RTR control packet comprises a reservation table that includes at least one of an active node schedule, an interference margin, a power of transmission, and a path loss between nodes.

8. An apparatus that schedules communications in an ad hoc communications network from at least a source node to a destination node via the apparatus, comprising:

a receiver that receives an RTR control packet from the source node;

a scheduler that analyzes available schedules and chooses an earliest schedule from among a plurality of schedules for communication between the source node and the apparatus, based on an admission control policy;

a transmitter that transmits an RTR packet to the destination node, the RTR packet includes the earliest communication schedule wherein the receiver is configured to receive an RC packet from the destination device and wherein the transmitter is configured to transmit the RC packet to the source node.

9. The apparatus of claim 8, the receiver further receives a first RC packet in response to the transmitted RTR packet and the transmitter sends a second RC packet to the source node.

10. The apparatus of claim 9, further comprising a configurer that appends the second RC packet to include the communication schedule.

11. The apparatus of claim 8, further comprising a reservation table that includes information about active neighboring devices, wherein the reservation table is updated with the communication schedule.

12. The apparatus of claim 8, further comprising a control policy processor that determines whether the chosen schedule is feasible.

13. The apparatus of claim 8, the transmitter uses a common code to transmit the RTR packet and the second RC packet.

14. An apparatus that schedules communications in an ad hoc communications network from a source device to a destination device via the apparatus, comprising:
- means for receiving an RTR control packet via a path from the source device to the apparatus;
- means for analyzing available schedules for the path;
- means for choosing an earliest schedule from among a plurality of schedules based on an admission control policy;
- means for conveying an RTR packet to the destination device, the RTR packet including the earliest schedule;
- means for receiving an RC packet from the destination device; and
- means for transmitting the RC packet to the source node.

15. The apparatus of claim 14, further comprising means for appending the RTR packet with a first reservation table for the apparatus and a second reservation table for the source device.

16. The apparatus of claim 14, further comprising:
- means for receiving a first RC packet that includes a communication schedule from the destination device; and
- means for sending a second RC packet that includes the communication schedule to the source device.

17. A non-transitory computer-readable medium embodying a method for scheduling communications in an ad hoc communications network from a source device to a destination device via an intermediate device, the method comprising:
- receiving an RTR control packet via a path from a source device to the intermediate device;
- analyzing available schedules for the path;
- choosing an earliest schedule from among a plurality of schedules based on an admission control policy;
- conveying an RTR packet to the destination device, the RTR packet including the earliest schedule;
- receiving an RC packet from the destination device; and
- transmitting the RC packet to the source node.

18. The non-transitory computer-readable medium of claim 17, the method further comprising appending the RTR packet with a first reservation table for the intermediate device and a second reservation table for the source device.

19. The non-transitory computer-readable medium of claim 17, the method further comprising:
- receiving a first RC packet that includes a communication schedule from the destination device; and
- sending a second RC packet that includes the communication schedule to the source device.

20. An article of manufacture for scheduling communications in an ad hoc communications network from at least a first wireless device to a destination device via an intermediate device, the article of manufacture comprising a processor and a memory, the processor and the memory being coupled together, and the processor being configured to:
- receive an RTR control packet at the intermediate device from the at least a first wireless device;
- determine a schedule from the at least a first wireless device to the intermediate device, based on an admission control policy;
- choose an earliest schedule from among a plurality of schedules for communication between the at least a first wireless device and the intermediate device;
- send an RTR packet to the destination device;
- receive an RC packet from the destination device in response to the RTR packet; and
- transmit the RC packet to the at least a first wireless device, the RC packet including a communication schedule.

21. The processor of claim 20, further configured to append the RTR packet with a first reservation table for the intermediate device and a second reservation table for the at least a first wireless device.

22. The processor of claim 20, wherein the intermediate device comprises the processor.

* * * * *